(12) United States Patent
Loheide et al.

(10) Patent No.: US 11,451,845 B2
(45) Date of Patent: Sep. 20, 2022

(54) PUBLISHING A DISPARATE LIVE MEDIA OUTPUT STREAM THAT COMPLIES WITH DISTRIBUTION FORMAT REGULATIONS

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US); Gregory McClain Stigall, Douglasville, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 17/340,166

(22) Filed: Jun. 7, 2021

(65) Prior Publication Data
US 2021/0297719 A1     Sep. 23, 2021

Related U.S. Application Data

(63) Continuation of application No. 16/230,493, filed on Dec. 21, 2018, now Pat. No. 11,082,734.

(51) Int. Cl.
*H04N 21/262* (2011.01)
*H04N 21/258* (2011.01)
*H04N 21/81* (2011.01)
*H04N 21/488* (2011.01)
*H04N 21/845* (2011.01)

(52) U.S. Cl.
CPC . *H04N 21/26208* (2013.01); *H04N 21/25841* (2013.01); *H04N 21/2625* (2013.01); *H04N 21/4884* (2013.01); *H04N 21/8106* (2013.01); *H04N 21/8456* (2013.01)

(58) Field of Classification Search
CPC ....... H04N 21/26208; H04N 21/25841; H04N 21/2625; H04N 21/4884; H04N 21/8106; H04N 21/8456
See application file for complete search history.

(56) References Cited

U.S. PATENT DOCUMENTS

| 8,553,853 | B2 | 10/2013 | Middleswarth et al. |
| 8,600,382 | B2 | 12/2013 | Hicks, III |
| 8,954,521 | B1 | 2/2015 | Faaborg et al. |
| 9,380,264 | B1 | 6/2016 | Vakalapudi |
| 2004/0172662 | A1 | 9/2004 | Danker et al. |
| 2005/0015816 | A1 | 1/2005 | Christofalo et al. |

(Continued)

OTHER PUBLICATIONS

Corrected Notice of Allowance for U.S. Appl. No. 15/986,451 dated Nov. 16, 2021.

(Continued)

*Primary Examiner* — Nicholas T Corbo
(74) *Attorney, Agent, or Firm* — Chip Law Group

(57) ABSTRACT

Provided is a system and method for publishing a disparate live media output stream that complies with distribution format regulations. The system generates a preview based on a low-latency protocol for a plurality of live input streams. Based on at least one event identified in the preview in real-time, an updated schedule is generated. In accordance with the updated schedule, a disparate live media output stream manifest is generated based on manipulation of manifests of the plurality of live input streams and pre-encoded media assets.

20 Claims, 8 Drawing Sheets

(56) References Cited

U.S. PATENT DOCUMENTS

| | | | |
|---|---|---|---|
| 2006/0287915 A1 | 12/2006 | Boulet et al. |
| 2009/0285217 A1 | 11/2009 | Frink et al. |
| 2009/0287790 A1 | 11/2009 | Upton et al. |
| 2010/0287297 A1 | 11/2010 | Lefebvre |
| 2011/0123062 A1 | 5/2011 | Hilu |
| 2011/0177775 A1 | 7/2011 | Gupta et al. |
| 2011/0209181 A1 | 8/2011 | Gupta et al. |
| 2011/0246202 A1 | 10/2011 | McMillan et al. |
| 2012/0271942 A1 | 10/2012 | Walker et al. |
| 2013/0205212 A1 | 8/2013 | Sinha et al. |
| 2013/0276023 A1 | 10/2013 | Kent et al. |
| 2014/0152894 A1 | 6/2014 | Childs et al. |
| 2014/0186001 A1 | 7/2014 | Aldrey et al. |
| 2014/0359656 A1 | 12/2014 | Banica et al. |
| 2015/0074732 A1 | 3/2015 | Green et al. |
| 2015/0289022 A1 | 10/2015 | Gross |
| 2015/0381936 A1 | 12/2015 | Goyal et al. |
| 2016/0105477 A1 | 4/2016 | Holden et al. |
| 2016/0127788 A1 | 5/2016 | Roberts et al. |
| 2016/0142783 A1 | 5/2016 | Bagga et al. |
| 2016/0150290 A1 | 5/2016 | Chandler et al. |
| 2016/0316247 A1 | 10/2016 | Biagini et al. |
| 2017/0099506 A1 | 4/2017 | Grover |
| 2017/0164019 A1 | 6/2017 | Oh et al. |
| 2017/0195718 A1 | 7/2017 | Nair et al. |
| 2017/0257446 A1 | 9/2017 | Bevilacqua et al. |
| 2017/0289597 A1 | 10/2017 | Riedel et al. |
| 2018/0165650 A1 | 6/2018 | Kashyape et al. |
| 2018/0184047 A1 | 6/2018 | Simonsen et al. |
| 2018/0367823 A1 | 12/2018 | Brinkley et al. |
| 2020/0059308 A1 | 2/2020 | Cox et al. |
| 2020/0244778 A1 | 7/2020 | Berookhim et al. |

OTHER PUBLICATIONS

Corrected Notice of Allowance for U.S. Appl. No. 15/988,308 dated Oct. 20, 2021.
Corrected Notice of Allowance for U.S. Appl. No. 15/988,492 dated Dec. 3, 2021.
Corrected Notice of Allowance for U.S. Appl. No. 15/988,492 dated Oct. 20, 2021.
Final Office Action for U.S. Appl. No. 15/396,468 dated Dec. 2, 2021.
Final Office Action for U.S. Appl. No. 16/918,085 dated Dec. 8, 2021.
Final Office Action for U.S. Appl. No. 17/038,323 dated Nov. 1, 2021.
Non-Final Office Action for U.S. Appl. No. 17/017,241 dated Dec. 20, 2021.
Non-Final Office Action for U.S. Appl. No. 17/094,102 dated Sep. 20, 2021.
Non-Final Office Action for U.S. Appl. No. 17/094,319 dated Dec. 8, 2021.
Notice of Allowance for U.S. Appl. No. 17/326,258 dated Nov. 17, 2021.
Supplemental Notice of Allowance for U.S. Appl. No. 15/988,492 dated Nov. 9, 2021.
Corrected Notice of Allowability for U.S. Appl. No. 16/230,493 dated Jul. 8, 2021.
Corrected Notice of Allowance for U.S. Appl. No. 16/902,775 dated Jul. 30, 2021.
Corrected Noticeof Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/986,406 dated Jul. 16, 2021.
Corrected Noticeof Allowance for U.S. Appl. No. 15/986,451 dated Aug. 11, 2021.
Corrected Notice of Allowance for U.S. Appl. No. 16/229,614 dated Jun. 29, 2021.
Corrected Notice of Allowance for U.S. Appl. No. 16/902,775 dated Jun. 11, 2021.
Final Office Action for U.S. Appl. No. 16/854,970 dated Aug. 18, 2021.
Non-Final Office Action for U.S. Appl. No. 16/918,085 dated Aug. 19, 2021.
Non-Final Office Action for U.S. Appl. No. 15/988,572 dated Aug. 25, 2021.
Non-Final Office Action for U.S. Appl. No. 16/985,444 dated Sep. 3, 2021.
Non-Final Office Action for U.S. Appl. No. 17/038,323 dated Jul. 1, 2021.
Notice of Allowance for U.S. Appl. No. 15/988,308 dated Jul. 30, 2021.
Notice of Allowance for U.S. Appl. No. 15/988,492 dated Jul. 30, 2021.
Supplemental Notice of Allowance for U.S. Appl. No. 15/986,406 dated Jun. 9, 2021.
Corrected Notice of Allowance for U.S. Appl. No. 15/986,451 dated Jan. 5, 2022.
Corrected Notice of Allowance for U.S. Appl. No. 15/988,308 dated Dec. 22, 2021.
Corrected Notice of Allowance for U.S. Appl. No. 15/988,308 dated Jan. 24, 2022.
Corrected Notice of Allowance for U.S. Appl. No. 15/988,308 dated Mar. 2, 2022.
Corrected Notice of Allowance for U.S. Appl. No. 17/017,145 dated Mar. 4, 2022.
Corrected Notice of Allowance for U.S. Appl. No. 17/038,323 dated Feb. 2, 2022.
Corrected Notice of Allowance for U.S. Appl. No. 17/094,102 dated Mar. 10, 2022.
Corrected Notice of Allowance for U.S. Appl. No. 17/326,258 dated Dec. 22, 2021.
Corrected Notice of Allowance for U.S. Appl. No. 17/326,258 dated Feb. 25, 2022.
Corrected Notice of Allowance for U.S. Appl. No. 17/326,258 dated Mar. 14, 2022.
Corrected Notice of Allowance for U.S. Appl. No. 17/326,258 dated Mar. 2, 2022.
Final Office Action for U.S. Appl. No. 15/988,572 dated Mar. 10, 2022.
Non-Final Office Action for U.S. Appl. No. 16/854,970 dated Feb. 17, 2022.
Non-Final Office Action for U.S. Appl. No. 17/017,052 dated Dec. 27, 2021.
Non-Final Office Action for U.S. Appl. No. 17/017,145 dated Dec. 22, 2021.
Non-Final Office Action for U.S. Appl. No. 17/147,887 dated Dec. 22, 2021.
Non-Final Office Acton for U.S. Appl. No. 17/016,789 dated Dec. 21, 2021.
Notice of Allowance for U.S. Appl. No. 15/396,468 dated Mar. 18, 2022.
Notice of Allowance for U.S. Appl. No. 16/895,439 dated Mar. 1, 2022.
Notice of Allowance for U.S. Appl. No. 16/902,893 dated Feb. 25, 2022.
Notice of Allowance for U.S. Appl. No. 16/985,444 dated Jan. 10, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/017,145 dated Feb. 16, 2022.
Notice of Allowance for U.S. Appl. No. 17/038,323 dated Jan. 12, 2022.
Notice of Allowance for U.S. Appl. No. 17/094,102 dated Jan. 14, 2022.
Corrected Notice of Allowance for U.S. Appl. No. 15/396,468 dated Apr. 1, 2022.

(56) References Cited

OTHER PUBLICATIONS

Corrected Notice of Allowance for U.S. Appl. No. 16/985,444 dated Apr. 20, 2022.
Corrected Notice of Allowance for U.S. Appl. No. 16/985,444 dated Jun. 1, 2022.
Corrected Notice of Allowance for U.S. Appl. No. 16/985,444 dated Mar. 25, 2022.
Corrected Notice of Allowance for U.S. Appl. No. 17/016,789 dated May 18, 2022.
Corrected Notice of Allowance for U.S. Appl. No. 17/017,145 dated Jun. 2, 2022.
Corrected Notice of Allowance for U.S. Appl. No. 17/017,145 dated May 17, 2022.
Corrected Notice of Allowance for U.S. Appl. No. 17/038,323 dated Apr. 19, 2022.
Corrected Notice of Allowance for U.S. Appl. No. 17/038,323 dated May 26, 2022.
Corrected Notice of Allowance for U.S. Appl. No. 17/094,102 dated Apr. 20, 2022.
Corrected Notice of Allowance for U.S. Appl. No. 17/094,102 dated May 17, 2022.
Corrected Notice of Allowance for U.S. Appl. No. 17/094,319 dated May 17, 2022.
Corrected Notice of Allowance for U.S. Appl. No. 17/147,887 dated May 18, 2022.
Corrected Notice of Allowance for U.S. Appl. No. 17/326,258 dated Apr. 19, 2022.
Final Office Action for U.S. Appl. No. 17/017,241 dated Apr. 28, 2022.
Non-Final Office Action for U.S. Appl. No. 16/918,085 dated Mar. 31, 2022.
Notice of Allowability for U.S. Appl. No. 16/092,893 dated Jun. 8, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated May 13, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/326,258 dated Apr. 27, 2022.
Corrected Notice of Allowance for U.S. Appl. No. 17/017,052 dated Jun. 15, 2022.
Corrected Notice of Allowance for U.S. Appl. No. 17/094,319 dated Jun. 15, 2022.
Non-Final Office Action for U.S. Appl. No. 17/527,817 dated Jun. 15, 2022.
Corrected Notice of Allowance for U.S. Appl. No. 15/396,468 dated Jun. 24, 2022.
Corrected Notice of Allowance for U.S. Appl. No. 17/016,789 dated Jun. 27, 2022.
Corrected Notice of Allowance for U.S. Appl. No. 17/017,052 dated Aug. 1, 2022.
Corrected Notice of Allowance for U.S. Appl. No. 17/017,145 dated Jul. 22, 2022.
Corrected Notice of Allowance for U.S. Appl. No. 17/017,241 dated Aug. 3, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,319 dated Aug. 1, 2022.
Corrected Notice of Allowance for U.S. Appl. No. 17/147,887 dated Jul. 22, 2022.
Non-Final Office Action for U.S. Appl. No. 17/206,473 dated Jun. 22, 2022.
Non-Final Office Action for U.S. Appl. No. 17/206,737 dated Jun. 23, 2022.
Notice of Allowability for U.S. Appl. No. 16/895,439 dated Jul. 20, 2022.
Notice of Allowability for U.S. Appl. No. 16/902,893 dated Jul. 20, 2022.
Notice of Allowability for U.S. Appl. No. 17/017,241 dated Jul. 15, 2022.

FIG. 3

PUBLISHING A DISPARATE LIVE MEDIA OUTPUT STREAM THAT COMPLIES WITH DISTRIBUTION FORMAT REGULATIONS

CROSS-REFERENCE TO RELATED APPLICATIONS/INCORPORATION BY REFERENCE

This Patent Application is a Continuation of U.S. patent application Ser. No. 16/230,493, filed on Dec. 21, 2018.

This application also makes reference to:
U.S. application Ser. No. 15/988,241, filed on May 24, 2018;
U.S. application Ser. No. 16/229,614, filed on Dec. 21, 2018; and
U.S. application Ser. No. 16/230,268, filed on Dec. 21, 2018.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing a disparate live media output stream that complies with distribution format regulations.

BACKGROUND

The past decade has witnessed a massive expansion of live web simulcast services in the field of advertisement-based broadcasting and cable networking systems. Broadcasting platforms usually refer to types of networks that are used to deliver media content to viewers. Currently, all the broadcasting platforms, such as analog terrestrial broadcast, digital terrestrial broadcast, direct-to-home satellite broadcast, cable, Internet Protocol (IP), and over-the-top television (OTT), compete and strive to increase their appeal in order to gain wider audience.

Modern web streaming protocols, such as HTTP Live Streaming (HLS) and Dynamic Adaptive Streaming over HTTP (DASH), are implemented to support streaming of live content services, such as DIRECTV NOW$^{SM}$, SLING TV$^{SM}$ and PLAYSTAYION™ VUE, to consumer devices. Traditional service providers, such as COMCAST$^{SM}$, also have set-top boxes capable of receiving both legacy broadcast distribution protocols, as well as modern web streaming protocols. However, such traditional service providers are constrained by the number of broadcast channels they can support on the legacy infrastructure and are more likely to allow more niche-based programming using Internet-based distribution.

Technically, such modern web streaming protocols break media content into numerous small broadcast content segments, typically less than 10 seconds in length. Modern web streaming protocols further implement a manifest that corresponds to a dataset that may instruct a media player what broadcast content segments to retrieve and play next.

Such modern web streaming protocols further support pre-encoded media assets, such as video-on-demand (VOD) assets, and live input streams, such as live media content, as well. The VOD assets prepared for web distribution may have a sequence of short duration video segments as well as a pre-encoded media asset manifest. The sequence may include separate physical files or pointers (real or to be calculated) to the short broadcast content segments inside a larger file. The pre-encoded media asset manifest may list all the video segments that make up the full length of the pre-encoded media asset. Alternatively, the pre-encoded media asset manifest may include instructions for the media player to be able to determine all the video segments of the pre-encoded media asset.

On the other hand, in the case of live input streams, new short live broadcast content segments may be made available as soon as they are created. In some protocols, each new short media content segment is added to a live input stream manifest while in others the media player is provided necessary information to calculate the next live media content segment. In the latter case, a signal in the live media content segment is used to inform the media player to re-inspect the live input stream manifest for a change in the live media content segment.

The pre-encoded media asset manifest, the live input stream manifest, and/or the broadcast content segments (in the pre-encoded media asset and/or the live input stream) may also include and/or specify additional information to facilitate the media player to transition smoothly between media content streams from different sources. The manifest may be used for creating a playlist of multiple media content files, or for interrupting media content stream with advertising and then resuming the media content stream.

Typically, in the broadcast industry, production control systems are utilized to allow an operator to switch between live input streams received from live sources, play pre-encoded media assets, such as VOD assets, insert and trigger non-programming content, and insert graphical treatment, such as network and program rating bugs. Further, for sources without embedded closed captions, the production control systems also support providing an audio feed to an operator, such as a stenographer, for creation and insertion of the closed captions. The output of such production control systems are referred to as a fully produced feed ready for distribution.

However, such production control systems require the live sources to be aggregated at a central location, so that the production control systems can decode corresponding live input streams for processing. The aggregation and decoding is essential in case of live input streams as corresponding schedule $111s$ tend to change owing to various reasons, such as when live events or programs end early or run long. In case of the pre-encoded media assets, fast switching may be required between the redundant broadcast air chains in case of a failure. But, this approach is expensive and is therefore suited for such channels that can attract large audiences to justify the cost.

Given the trends toward media content distribution using such streaming protocols, there is required a system to eliminate the need to aggregate and decode the live sources at a central location. Thus, an advanced system may be required that reduces the production cost, and also provide enhanced viewer experience to increase viewer appeal in order to gain a wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing a disparate live media output stream that complies with distribution format regulations, substantially as shown in and/ or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 3 illustrates an exemplary scenario associated with a disparate live media output stream that complies with distribution format regulations by the VPC system 115, in accordance with an exemplary embodiment of the disclosure.

DETAILED DESCRIPTION OF THE DISCLOSURE

Certain embodiments of the disclosure may be found in a method and system for publishing a disparate live media output stream that complies with distribution format regulations. Various embodiments of the disclosure provide a method and system that virtualizes the production control functions, eliminating the need to aggregate and decode the live sources at a central location to not only provide channel offerings in cost-effective manner but also provide enhanced viewer experience to increase their appeal in order to gain wider audience. Further, the method and system may be configured to edit portions of the archived content prior to replay.

Various embodiments of the disclosure may provide one or more processors in a system. The one or more processors may generate a preview based on a low-latency protocol for a plurality of live input streams. In accordance with an embodiment, the plurality of live input streams may include additional audio content that identifies location and duration of a non-programming content for live events that correspond to the plurality of live input streams. One or more media segments of a live input stream of the plurality of live input streams are edited based on manipulation of a manifest of the live input stream. The one or more processors may further generate an updated schedule based on one or more events identified in the preview of live input streams in real-time. The updated schedule may include one or more transitions between the plurality of live input streams and a plurality of pre-encoded media assets. The one or more processors may further generate a disparate live media output stream manifest based on manipulation of manifests of the plurality of live input streams and the plurality of pre-encoded media assets in accordance with the updated schedule. The generated disparate live media output stream manifest may be delayed to allow decisions based on the previewed live input streams in a disparate live media output stream. The generated disparate live media output stream manifest may correspond to a disparate live media output stream. The disparate live media output stream may include programming content and non-programming content available to the one or more processors for immediate consumption. The disparate live media output stream complies with distribution format regulations.

Figure 1A:
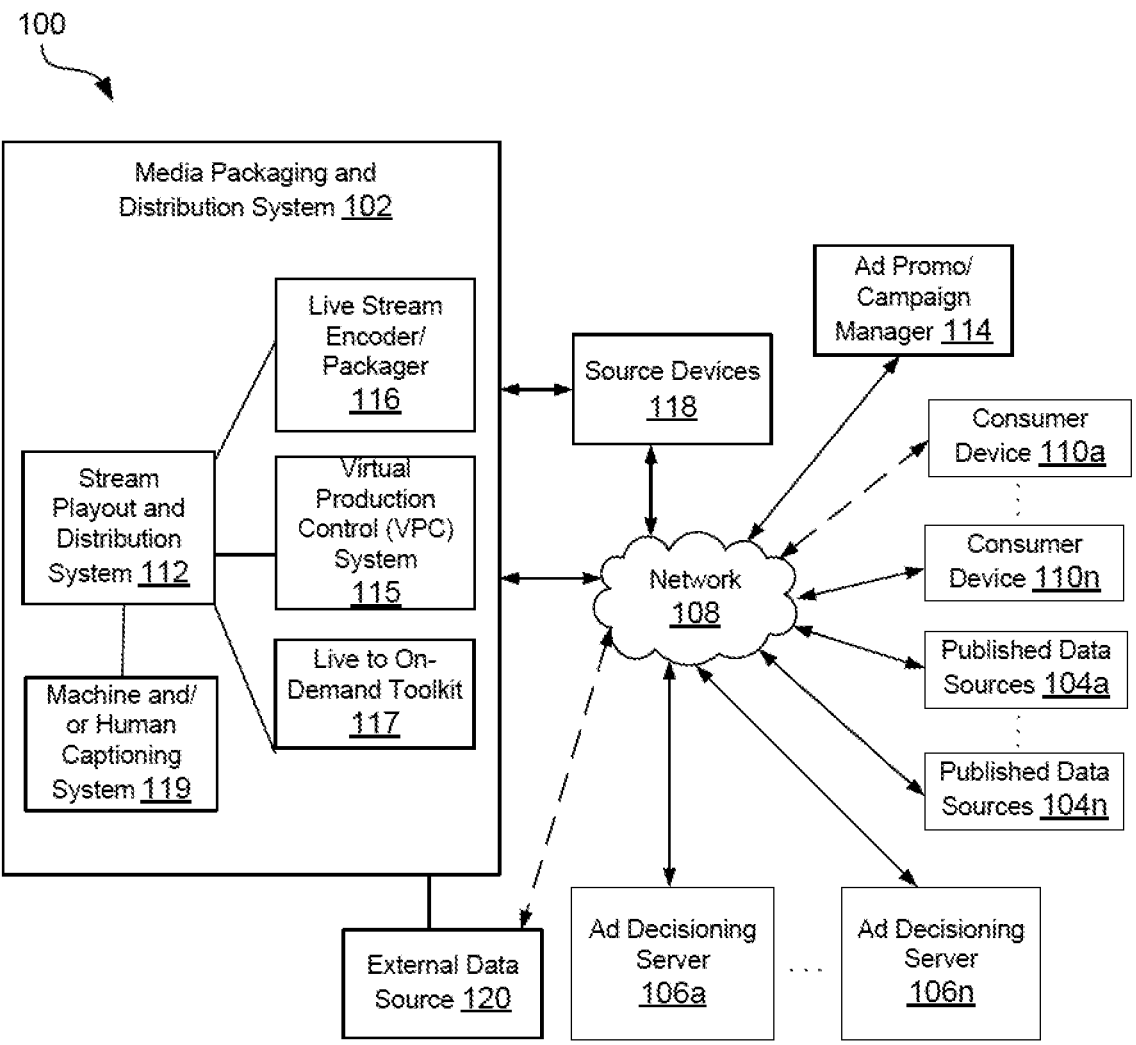
FIG. 1A is a block diagram that illustrates an exemplary system for publishing a disparate live media output stream that complies with distribution format regulations, in accordance with an exemplary embodiment of the disclosure.

FIG. 1A is a block diagram that illustrates an exemplary system for publishing a disparate live media output stream that complies with distribution format regulations, in accordance with an exemplary embodiment of the disclosure. Referring to FIG. 1A, the system 100, comprises a media packaging and distribution system 102, communicatively coupled to published data sources 104a, . . . , 104n, and Ad decisioning servers 106a, . . . , 106n, via a network 108 and/or other programmatic means. There are also shown consumer devices 110a, . . . , 110n communicatively coupled to the media packaging and distribution system 102 via the network 108. The media packaging and distribution system 102 includes a stream playout and distribution system 112. The system 100 further includes an ad/promo campaign manager 114, a virtual production control (VPC) system 115, a live stream encoder/packager 116, a Live to On-Demand toolkit system 117, a source device 118, a machine and/or human captioning system 119, and an external data source 120 communicatively coupled to the media packaging and distribution system 102 via the network 108.

The media packaging and distribution system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata. Accordingly, the media packaging and distribution system 102 provides a disparate live media output stream that complies with distribution format regulations.

In this regard, the media packaging and distribution system 102 may provide video programming services to viewers, usually for a subscription fee (such as pay television). The media packaging and distribution system 102 also handles distribution, for example, multicasting, unicasting, broadcasting, streaming, for one or more channels to be viewed on one or more of the consumer devices 110a, ..., 110n.

The media packaging and distribution system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the media packaging and distribution system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of schedule 111, insertion of triggers, and the like, and final delivery by a broadcasting apparatus. The linear video feed may be provided as a multi-program transport stream (MPTS) (also referred to as a live video feed) to the media packaging and distribution system 102, via the network 108. The MPTS may be distributed over traditional means as the MPTS may receive the schedule and be made aware of blackouts, show overruns or last-minute show replacements only. The broadcast provider may be owned by (or associated to) a broadcast provider or operator, a network provider or operator, or a content provider or operator.

The media packaging and distribution system 102 may receive the MPTS, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the media packaging and distribution system 102 may be signaled for various blackout types with in-band SCTE-35 message. Further, the media packaging and distribution system 102 may receive program metadata that specifies certain events or operations, such as, for example, when to blackout shows. Examples of legacy distribution system that may be benefited from the media packaging and distribution system 102 may include direct-broadcast satellite (DBS) providers, cable television (CATV) systems, and other wireline video providers and competitive local exchange carriers (CLECs) using, for example, IPTV.

Each of the plurality of published data sources 104a, ..., 104n may be coupled to one or more television networks and may comprise suitable logic, circuitry, and interfaces that may be configured to execute code that provides actual audiences for programs that were distributed. As illustrated in FIG. 1A, the plurality of published data sources 104a, ..., 104n are coupled to the media packaging and distribution system 102 via the network 108 and configured to monitor audience drift to or away from a tuned channel airing a live media output stream. An exemplary published data source may be Nielsen. Another exemplary published data source may be a published database that provides ratings for a media item, such as gross rating point (GRP). The GRP is an advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106a, ..., 106n may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams based on the detected upcoming indicator, such as an inbound trigger, a signaling point, and/or a signal in a pre-encoded media asset and/or a live input stream by the Ad decisioning servers 106a, ..., 106n. The Ad decisioning servers 106a, ..., 106n may receive a request for retrieval of non-programming content, for example, ads, from a non-programming content proxy server (not shown). Specifically, the Ad decisioning servers 106a, ..., 106n may receive the request from one or more of the consumer devices 110a, ..., 110n, via the non-programming content proxy server (not shown). The request may be received when one or more indicators and/or pre-encoded place holder content segment for a scheduled duration of one or more non-programming content breaks. The scheduled durations of one or more non-programming content breaks may be defined by a received schedule 111, and are encountered in the disparate live media output stream manifest during media content playout by media players at the one or more of the consumer devices 110a, ..., 110n.

Thus, for requests received from the consumer devices 110a, ..., 110n, based on corresponding disparate live media output stream manifests, the Ad decisioning servers 106a, ..., 106n may identify the opportunities for the real-time content or advertisement placement activity. In this regard, as the advertisement decisioning component of the Ad decisioning servers 106a, ..., 106n is implemented in a consumer device, such as one or more of the consumer devices 110a, ..., 110n, the Ad decisioning servers 106a, ..., 106n may identify real-time content or advertisement placement opportunity for dynamic ad insertion. For example, commercial or non-commercial advertisements may be dynamically inserted within program segments of a media feed based on the detected indicator, such as upcoming inbound trigger, signaling point, and/or signal, in the disparate live media output stream manifest by the Ad decisioning servers 106a, ..., 106n when the ad decisioning component is implemented in the consumer device. In various embodiments, the advertisement decisioning component of the Ad decisioning servers 106a, ..., 106n may be configured to determine which advertisements, graphical treatment graphics and presentation information to serve to the consumer devices 110a, ..., 110n based on stream ID, a program ID, a geographical location, time, and any preferences associated with an individual consumer or an advertisement ID specified by the disparate live media output stream manifest.

The network 108 may be any kind of network, or a combination of various networks, and it is shown illustrating exemplary communication that may occur between the Ad decisioning servers 106a, . . . , 106n and the media packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio or satellite. Furthermore, the network 108 may be an exemplary embodiment of a distribution system.

The consumer devices 110a, . . . , 110n may refer to end-user devices or consumption devices where the content is played to be consumed by a user. The number of impressions of a media item, such as an advertisement and/or promotional media, on such consumer devices 110a, . . . , 110n determines the advertising impact or promotion impact and number of actual audiences achieved during campaigns. Examples of the consumer devices 110a, . . . , 110n may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110a, . . . , 110n may further include process/system that may process the output for any means, regardless of the capability or intent to decode for media presentation, and on which the consumer may launch a web page, a web application, or a web service to view media content.

The stream playout and distribution system 112 may comprise suitable logic, circuitry, and interfaces that may be configured to execute a code to generate a plurality of disparate live media output stream manifests by manipulating manifests of pre-encoded media assets and/or pre-encoded live input streams. In accordance with an embodiment, the plurality of disparate live media output stream manifests may be generated for consumer devices 110a, . . . , 110n based on respective ability to support one-to-one targeted insertion of non-programming content, such as ads. In accordance with another embodiment, the plurality of disparate live media output stream manifests may be generated for media players, such as IP receivers, based on respective geographic locations. The stream playout and distribution system 112 may be configured to encrypt and protect (by means of digital rights management) the plurality of disparate live media output stream manifests before distribution to such media players.

The ad/promo campaign manager 114 may comprise suitable logic, circuitry, and interfaces that may be configured to execute a code to receive non-programming content, such as ad and/or promotional content campaigns, from ad sales. Such ad campaigns may be sold including, for example, audience targets, creatives, length of campaign, separation rules, and the like. The ad/promo campaign manager 114 may further receive windows for the campaigns along with desired audience demographics and segments, and ad versions. The ad/promo campaign manager 114 may be configured to inform the stream playout and distribution system 112 when new ads or promos are entered in to the ad/promo campaign manager 114 by the ad sales.

The live stream encoder/packager 116 may comprise suitable logic, circuitry, and interfaces that may be configured to execute a code to encode and package the live feeds or live source streams to generate live input streams. The live stream encoder/packager 116 may be further configured to generate a plurality of live input stream manifests corresponding to the each of the live input streams. Various media container formats of the live input streams may include, but are not limited to, transport stream (TS), fragmented MP4 (fMP4), Common Media Application Format (CMAF) and the like. Various formats of the plurality of live input stream manifests or playlists, may include, but are not limited to DASH and HLS. The generated live input streams and manifests may be used for distribution, such as Internet distribution. The generated live input streams and manifests may be further published to a content delivery system for delivery to various consumer devices 110a, . . . , 110n.

The VPC system 115 may comprise suitable logic, circuitry, and interfaces that may be configured to execute a code to allow an operator to receive preview of live input streams and manually update the schedule 111 in near-real time to insert non-programming content, such as ad breaks, in programming content, such as live events. The VPC system 115 may be further configured to switch to an alternate live source stream or a pre-encoded media asset, based on one or more reasons, such as technical issues, provide an alternate view (camera angle), delay the next event in the schedule 111 if a current live event runs long, insert filler programming content if a live event ends early, and insert overlay indicators to signal insertion or removal of non-programming content, such as ratings bugs, program bugs, or the like. The VPC system 115 may be configured to generate an output feed which is ready for distribution.

The Live to On-Demand toolkit system 117 may comprise suitable logic, circuitry, and interfaces that may be configured to execute a code to manage the capture of media content from a live input stream to create on an On-Demand or a pre-encoded media asset. The Live to On-Demand toolkit system 117 may a plurality of tools to support simple editing of the captured asset prior to publishing it to the content delivery system 160. The Live to On-Demand toolkit system 117 may be further configured to select, extract, and decrypt a defined range of one or more media segments for additional one or more edits.

The source devices 118 may comprise suitable logic, circuitry, and interfaces that may be configured to communicate a live media feed or live input streams of a channel, such as an existing channel, to the media packaging and distribution system 102. In accordance with an embodiment, the live input streams of the channel may correspond to a broadcast feed. The source device 118 may be communicatively coupled to the network 108.

The machine and/or human captioning system 119 may correspond to a man-machine interface or an artificial intelligence (AI) tool that may listen to the audio track and may provide a text translation corresponding to the audio track. The test translation may further include descriptions, such as laughing, crying, cheering, knock at door, and the like, to define what is happening in the audio track. In accordance with an embodiment, the machine and/or human captioning system 119 may provide the text translation to the VPC system 115 in a Web Video Text Tracks Format (WebVTT) format which displays timed text tracks (such as subtitles or captions) using a track element.

The external data source 120 may comprise suitable logic, circuitry, and interfaces that may be configured to execute code that handles retrieval and storage of audience data that corresponds to subscribers of the consumer devices 110a, . . . , 110n. The audience data may include demographics data, audience targeting data, trending data, device type data, device platform data, and content recognition-based data, such as automatic content recognition (ACR)-based data. The trending data comprises information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

In operation, a stream publishing engine (further shown in FIG. 1B) in the media packaging and distribution system 102 may generate a preview of the live input streams based on a low-latency protocol. The preview may be generated based on an insertion of a new segment from the scheduled live input stream manifest into a preview manifest of the live input streams on an interval not greater than the previous content segment duration. The low-latency protocol may be a protocol, for example the real time streaming protocol (RTSP), may provide significant reduction in latency by simply reducing the size (or duration) of referenced media segments through sub-segmentation. Accordingly, the VPC system 115 may be configured to generate an updated schedule based on one or more events identified in the preview of the plurality of live input streams in real-time. The updated schedule may include one or more transitions between the plurality of live input streams and the plurality of pre-encoded media assets. For example, an operator associated with the VPC system 115 may view the preview of the plurality of live input streams including listening to the alternative audio and may update the schedule in real time based on the events in the preview. In accordance with an embodiment, the stream publishing engine may be configured to generate a preview stream of the live stream output manifest when the closed captions for the live event are requested. The stream publishing engine may be configured to communicate the preview stream of the live stream output manifest to a machine and/or human captioning system. Consequently, the VPC system 115 may be configured to generate the live captions stream. The segmented caption files in the live captions stream may be published to the content delivery system 160. The caption stream manifest may be delivered to the stream publishing engine to be published along with the other video and audio streams. The stream publishing engine may be configured to generate the disparate live media output stream manifest based on manipulation of manifests of a plurality of live input streams and plurality of pre-encoded media assets in accordance with updated schedule.

The VPC system 115 may virtualize various production control functions, thereby eliminating the need to aggregate and decode the live media sources at a central location, as the operator is provided with a view of the available live media sources slightly ahead of the end consumer device. The operator may, in real-time, adjust the schedule to control switching between the various live input sources and pre-encoded media assets including ads, as well as insert ad and overlay indicators into the disparate live media output stream manifest. The switches may be executed simply by manipulating the text-based disparate live media output stream manifest based on instructions from the operator.

In accordance with another embodiment, the Live to On-Demand toolkit system 117 may be configured to capture a live input stream manifest for a defined scheduled time or between program start and end indictors to archive live programs for a delayed playback, an event replay, or On-Demand viewing. The Live to On-Demand toolkit system 117 may communicate with a content delivery system to move the media segments listed in the asset from the network edge to a more permanent storage location. The Live to On-Demand toolkit system 117 may provide an interface for an operator to view the archived content and edit the manifest to add or move indicators, remove some media segments, and/or change some of the referenced one or more media segments. In accordance with an embodiment, the Live to On-Demand toolkit system 117 may be configured to select, extract, and decrypt the defined range of the one or more media segments for additional one or more edits through the interface. The manifest of the modified pre-encoded media asset for a live event as the new pre-encoded media asset may be indexed, and made available for a delayed playback, or a re-play of the live event in the disparate live media output stream.

Figure 1B:
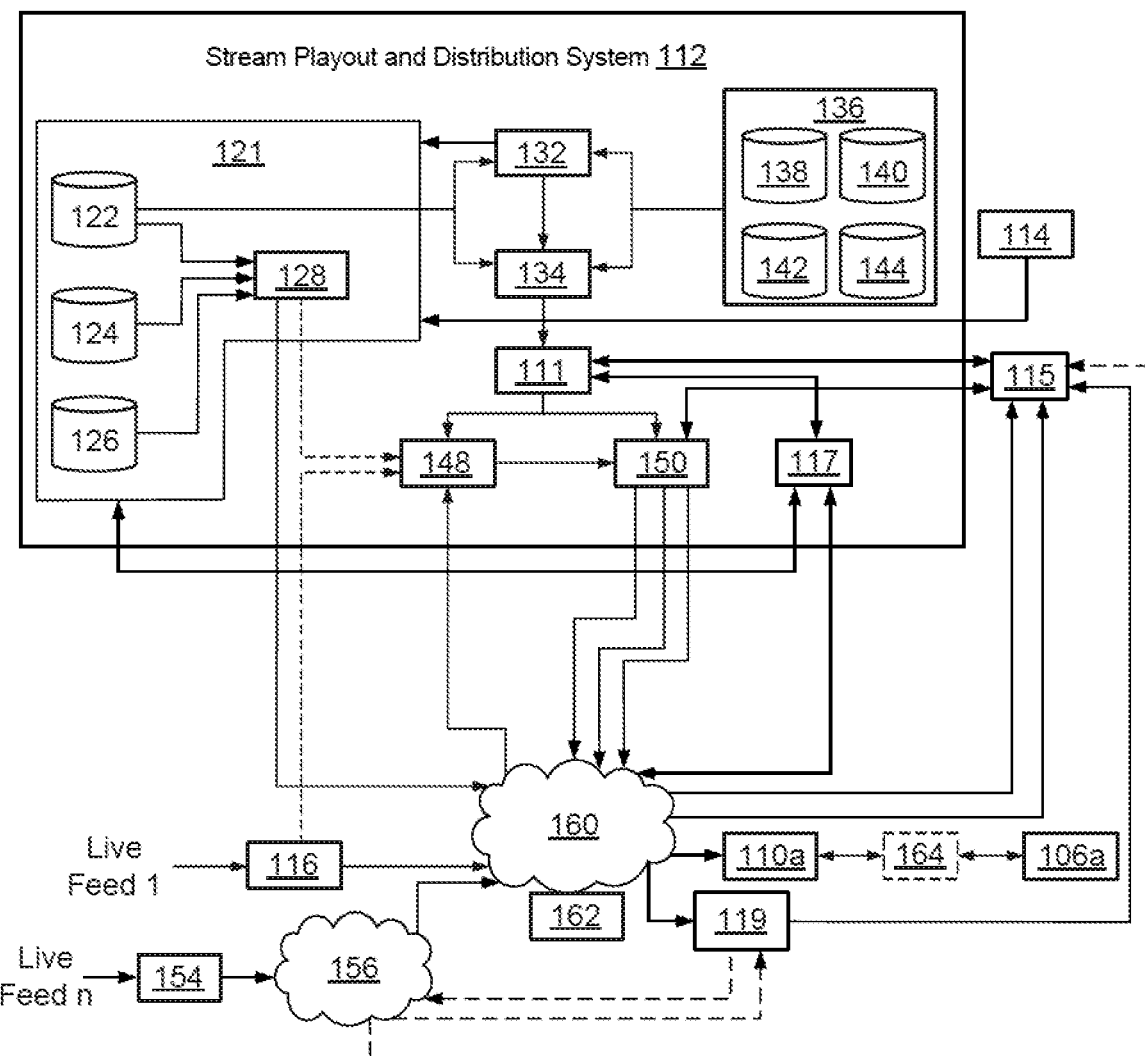
FIG. 1B is a block diagram that illustrates an exemplary stream playout and distribution system for publishing a disparate live media output stream that complies with distribution format regulations, in accordance with an exemplary embodiment of the disclosure.

FIG. 1B is a block diagram that illustrates an exemplary stream playout and distribution system for publishing a disparate live media output stream that complies with distribution format regulations, in accordance with an exemplary embodiment of the disclosure. Referring to FIG. 1B, the stream playout and distribution system 112 may further comprise a schedule 111, a content processing system 121 including a media content metadata storage system 122, a media content master storage system 124, an ad/promo content master storage system 126, and a content encoder/packager 128. The stream playout and distribution system 112 may further include a broadcast network scheduler 132, a traffic system 134, and a schedule planning database 136. The schedule planning database 136 may further include content rights storage 138, historical performance storage 140, competitive analysis storage 142, and channel preference storage 144. The stream playout and distribution system 112 may further include an indexing and storage system 148, a stream publishing engine 150, and a Live to On-Demand toolkit system 117. There is further shown a live stream backhaul system 154, a central ingest encode/package system 156, a content delivery system 160, a media storage 162, and a proxy server 164. There is further shown the consumer device 110a and the Ad decisioning server 106a, as described in FIG. 1A.

In some embodiments of the disclosure, the content processing system 121, the broadcast network scheduler 132, the traffic system 134, the schedule planning database 136, the indexing and storage system 148, the stream publishing engine 150, and the Live to On-Demand toolkit system 117 may be integrated to form an integrated system. In some embodiments of the disclosure, the content processing system 121, the broadcast network scheduler 132, the traffic system 134, the schedule planning database 136, the indexing and storage system 148, the stream publishing engine 150, and the Live to On-Demand toolkit system 117 may be distinct. Other separation and/or combination of the various entities of the exemplary stream playout and distribution system 112 illustrated in FIG. 1B may be done without departing from the spirit and scope of the various embodiments of the disclosure.

The schedule 111 may be a schedule that may correspond to a data set for playout of an existing first disparate live media output stream for a live channel. The schedule 111 may inform the stream publishing engine 150 about pre-encoded media assets and/or live input streams as well as when and how to switch between the various pre-encoded media assets and live input streams. The schedule 111 may also support defining timing for network logos, insertion of promotional graphics break durations for mid roll ads, break locations, and durations in the pre-encoded media asset and live input stream switches. The schedule 111 may further include specific ads to be played during each break or may simply mark the ad break and include filler content if an Ad decisioning server, such as the Ad decisioning server 106a, will be used to better target the ads to individual consumer devices, such as the consumer device 110a.

The content processing system 121 may comprise suitable logic, circuitry, and interfaces that may be configured to store, encode and package media assets to generate pre-encoded media assets and corresponding manifests. The content processing system 121 may comprise master versions of media content, corresponding metadata, and master versions of non-programming content, such as ads and promotional content. Various media container formats of the pre-encoded media assets may include, but are not limited to, TS, fMP4, CMAF, and the like. Various formats of the plurality of pre-encoded media asset manifests or playlists, may include, but are not limited to DASH and HLS.

The media content metadata storage system 122 may comprise suitable logic, circuitry, and interfaces that may be configured to store media content metadata. The media content metadata may include metadata associated with broadcast content segments stored in the media content master storage system 124. Examples of the media content metadata may include a media content identifier, a title of the media content, type of the media content (such as movie series (season episode number)), genre, plot summary, duration, advertisement break locations, credit locations, scene descriptions, a short summary of the broadcast content segments, a short summary of ideal advertisement placements within the broadcast content segments, a file format, digital right management (DRM), encryption information, length of the media content, a date and/or time the media content was added to the catalog of media content master storage system 124, a new item indicator for the media content (e.g., a new media asset that became available within the last 24 hours, last few days, last week, and/or the like), and a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 122 may also store program-specific information (PSI) data as defined by ISO/IEC 13818-1 (MPEG-2), closed captioning data, and subtitles associated with the broadcast content segments stored in the media content master storage system 124. Other forms of metadata may be utilized without departing from the spirit and scope of the various embodiments of the disclosure.

The media content master storage system 124 may comprise suitable logic, circuitry, and interfaces that may be configured to store master versions of the media content. The master versions may be used as the source for creating the on-demand or pre-encoded media assets for consumer devices 110a, . . . , 110n in required formats. In an embodiment, various media container formats of the media content may include, but are not limited, TS, fMP4, CMAF, and the like.

The ad/promo content master storage system 126 may comprise suitable logic, circuitry, and interfaces that may be configured to store master versions of non-programming content, such as ads and promotional content. The master versions of non-programming content may be used as a source for creating on-demand or pre-encoded media assets for consumer devices 110a, . . . , 110n in the required formats.

The content encoder/packager 128 may comprise suitable logic, circuitry, and interfaces that may be configured to execute code to generate a package that includes media content and associated metadata. The content encoder/packager 128 may receive media content from the media content master storage system 124, corresponding metadata from the media content metadata storage system 122 and the non-programming content from the ad/promo content master storage system 126 to generate the package. Thus, the content encoder/packager 128 encodes and packages the media content into the required on-demand formats for delivery to the consumer device 110a. The broadcast content may correspond to one or more of the plurality of broadcast content segments transcoded to different types of streams for different types of devices, such as a TV or a mobile device, and marked with Nielson markers. Based on such a package, the stream playout and distribution system 112 may dynamically generate one or more encoded media assets for playout to one or more media players communicatively coupled through the content delivery system 160. In accordance with an embodiment, the content encoder/packager 128 may be directly coupled to the indexing and storage system 148. In accordance with an embodiment, the content encoder/packager 128 may be directly coupled to the content delivery system 160.

The content encoder/packager 128 may be configured to publish the one or more encoded media assets in real-time or near real-time for distribution, such as web distribution. The content encoder/packager 128 may be operable to create "C3" content assets and clips that may be made available before media content rolls out of the stream playout and distribution system 112. The content encoder/packager 128 may also be configured to provide near-real-time redundancy. The resulting converted output, such as one or more encoded media assets, that are generated by the content encoder/packager 128 may be communicated to the indexing and storage system 148 which may be communicatively coupled with the consumer devices 110a, . . . , 110n. The content encoder/packager 128 may also support a robust interface (e.g. application data interface (ADI)) that defines the on-demand duration of the individual broadcast content segments as well as encryption requirements and a service type to link for ad insertion.

For encoding and the packaging, the content encoder/packager 128 may be configured to mark locations of the one or more non-programming content breaks and condition the media content such that the locations of the one or more non-programming content breaks are adjacent to boundaries of the plurality of broadcast content segments. Based on the media content metadata, in case the one or more indicators are not included in the pre-encoded media asset at packaging time, the content encoder/packager 128 may be configured to insert the one or more indicators to mark the credits and overlay graphics locations in the media content.

Once the content encoder/packager 128 has encoded and packaged the media content based on the associated metadata corresponding to the media content assets for media distribution, the content encoder/packager 128 may be further configured to generate corresponding media content manifests. The media content manifests may correspond to data sets, such as text-based instruction sets, that may be utilized by the consumer device 110a to determine which broadcast content segments to play and storage locations of such broadcast content segments. In accordance with an embodiment, the content encoder/packager 128 may be further configured to add in-band indicators in the media content assets. The in-band indicators may indicate markers corresponding to location of the one or more non-programming content breaks, credits, and overlay graphic locations for one or more protocols that may be utilized to determine next media content asset to be downloaded.

The broadcast network scheduler 132 may comprise suitable logic, circuitry, and interfaces that may be configured to execute code to generate a broadcast content schedule which indicates programming content, such as pre-encoded media assets and/or live input streams, and when such programming content may be broadcasted to be played out. The broadcast network scheduler 132 may be configured to generate the broadcast content schedule based on inputs received from the media content metadata storage system 122 and the schedule planning database 136. The broadcast network scheduler 132 may be configured to schedule the programming content based on, for example, desired channel theme, content metadata, content rights, and competitive analysis of what competing programming content is available on other channels.

The traffic system 134 may comprise suitable logic, circuitry, and interfaces that may be configured to execute code to receive a list of programming content, such as the broadcast content schedule, to be played along with the program indicators, such as program start, from the broadcast network scheduler 132. The traffic system 134 may further determine break durations and locations based on media content conditioning and an amount of time to be filled to hit the start time of the next program in the list of programming content. The traffic system 134 may further determine what non-programming content, such as ads, to place based on data, such as historical performance and competitive analysis, received from the schedule planning database 136. The traffic system 134 may further insert network rules for schedules, such as overlay graphic schedules, and the like.

In accordance with an embodiment, the traffic system 134 may check from the media content metadata storage system 122 about media content duration and break schedule. Subsequently, the traffic system 134 may be configured to determine the duration for each ad break to have the program end at the correct scheduled time and have the new program start at the correct schedule time.

In accordance with an embodiment, the traffic system 134 may be communicatively coupled with the ad/promo campaign manager 114 to determine what ads and promos are available to be scheduled. The traffic system 134 may be configured to schedule all the advertisements to provide the highest yield based on historical performance. The traffic system 134 may further mark the entire ad break for downstream replacement on the consumer device 110a that is capable of individual ad targeting. The traffic system 134 may mark individual ads for downstream replacement if the ads are targeted to specific audience demographics or segments, or specific geo locations.

The schedule planning database 136 may comprise suitable logic, circuitry, and interfaces that may be configured to execute code to store information that may be used by the broadcast network scheduler 132 to generate the broadcast content schedule on a channel. Such broadcast content schedule results in maximized size and value of audience to advertisers. Such information may also be used to schedule non-programming content that may provide the highest revenue for the channel. In accordance with an embodiment, the information may define channel preferences including when and where to display logos and other graphics.

The content rights storage 138 may store a set of rules governing when and how media content may be used. For example, when the media content may be made available on-demand, if the media content may be made available over the Internet, whether the media content may be used in a disparate live media output stream and the timeframe, or is the user allowed to restart the media content when live streamed. The historical performance storage 140 may store a set of rules governing historical performance of users on the media content. The competitive analysis storage 142 may store a set of rules governing competitive analysis of various providers. For example, direct-broadcast satellite (DBS) providers, cable television (CATV) systems, and other wireline video providers and competitive local exchange carriers (CLECs) using IPTV. The channel preferences storage 144 may store previous media content selections by users for both live input streams and pre-encoded media assets that may be used to personalize and organize the channel preferences in future.

The indexing and storage system 148 may comprise suitable logic, circuitry, and interfaces that may be configured to execute code to receive the encoded media assets manifests from the content encoder/packager 128 and live input streams manifests from the live stream encoder/packager 116. Accordingly, the indexing and storage system 148 may perform indexing on the received encoded media assets manifests and/or live input streams manifests. For indexing, the indexing and storage system 148 may ingest the manifests associated with the encoded media assets and/or continuously ingest the manifests associated with live input streams, store data log of a plurality of indicators indicating non-programming content breaks, program start, program end, and graphic overlays included in the media assets, and validating completion of the indexing of the encoded media assets and/or live input streams. The indexing and storage system 148 may further index tags indicators, such as tag marking, program indicators, such as program boundaries, and non-program indicators, such as ad break locations, graphical treatment (such as overlay) opportunities credits, and DRM supported systems.

The stream publishing engine 150 may comprise suitable logic, circuitry, and interfaces that may be configured to execute code to insert information related to the plurality of broadcast content segments and one or more events from the pre-encoded media asset manifests and/or live input stream manifests into a disparate live media output stream manifest at defined intervals. The defined intervals may be intervals at which the insertion of the information related to the plurality of broadcast content segments and the one or more events from the pre-encoded media asset manifests and/or live input stream manifests into the disparate live media output stream manifest is performed, is not greater than duration of a previous media content segment. The disparate live media output stream manifest may correspond to a data set that includes playlists of a plurality of pre-encoded media assets and/or live input streams, information about the plurality of pre-encoded media assets and/or live input streams, one or more overlay opportunities, and duration of a set of non-programming content breaks within one on-demand media asset and/or live input streams or between at least two of the plurality of pre-encoded media assets and/or live input streams.

In accordance with an embodiment, before the stream publishing engine 150 publishes the next segment, for example of 2 seconds, 1 second or half-a-second, the stream publishing engine 150 may refer back to the schedule 111 if the schedule 111 is updated (by the VPC system 115). Thus, the stream publishing engine 150 may know when to switch from a first live stream source to a second live stream source when the schedule 111 is updated by the VPC system 115 in near-real time.

The stream publishing engine 150 may be further configured to publish the disparate live media output stream manifest, leveraging indexes of the pre-encoded media assets and/or live input streams received from the indexing and storage system 148, based on the schedule 111. In accordance with an embodiment, the stream publishing engine 150 may be configured to insert one or more overlay indicators, which are independent of, for example, a pre-encoded media asset, at defined time stamps in the generated disparate live media output stream. The stream publishing engine 150 may be further configured to support a plurality of digital rights management indicators in the disparate live media output stream manifest, and may include one or more of a program start, a program end, content or context change indicator, a break indicator, an overlay indicator in the generated disparate live media output stream manifest based on one or more events in the manifest or metadata associated with, for example, the pre-encoded media as set.

The Live to On-Demand toolkit system 117 may comprise suitable logic, circuitry, and interfaces that may be configured to execute code to manage the capture of media content from a live input stream to create a pre-encoded media asset, such as On-Demand asset. The Live to On-Demand toolkit system 117 may include a plurality of tools to support simple editing of the live input stream prior to publishing corresponding disparate live media output stream to the content delivery system 160. In accordance with an embodiment, the Live to On-Demand toolkit system 117 may encode the edited one or more media segments and package to match specifications of the live input stream. Accordingly, the Live to On-Demand toolkit system 117 may be configured to publish the encoded and packaged one or more media segments to the media storage 162 on the content delivery system 160.

The live stream backhaul system 154 may comprise suitable logic, circuitry, and interfaces that may be configured to execute code to generate an encoded feed from a live event location that is not processed for distribution, for example web distribution. The live stream backhaul system 154 may be used when the live event location does not support the bandwidth or have the technical infrastructure to support encoding, packaging, and publishing of a feed for final web distribution through the content delivery system 160.

The central ingest encode/package system 156 may comprise suitable logic, circuitry, and interfaces that may be configured to execute code to receive, encode, and package feeds from the live stream backhaul system 154 to prepare the live input streams for web distribution and publish the live input streams to the content delivery system 160.

The content delivery system 160 may correspond to the network 108, described in FIG. 1A. The content delivery system 160 may comprise networks configured for distributing media content to the consumer devices 110a, . . . , 110n. Generally, the term "content," "metadata," "media," and similar words are used interchangeably to refer to any type of media—audio, videos, datacasts, music, text, images, graphics, articles, still photos, animated photos, moving photos, photo galleries, video galleries, infographics, maps, polls, guest biographies, tweets or other social media, blog posts, and/or the like. The content delivery system 160 may be configured to provide a plurality of disparate live media output streams to the consumer devices 110a, . . . , 110n, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The media storage 162 may be configured to store encoded and packaged media assets, pre-encoded media asset manifests, live input streams, and live input stream manifests for distribution.

The proxy server 164 may comprise suitable logic, circuitry, and interfaces that may be configured to execute code to communicate with the consumer devices 110a, . . . , 110n. In accordance with an embodiment, the proxy server 164 may receive requests from the consumer devices 110a, . . . , 110n when the consumer devices 110a, . . . , 110n generate requests for the Ad decisioning server 106a upon encountering, for example, an advertisement break tag or an overlay tag in the updated disparate live media output stream. In other words, the consumer devices 110a, . . . , 110n may call the proxy server 164 to initiate the media stream. At stream set-up, any ad ID and information from the consumer devices 110a, . . . , 110n is passed to the proxy server 164. The proxy server 164 or the media player receives the manifest from the content delivery system 160 and decodes (or detects) the indicators, for example break indicators, for non-programming content, such as ads. The proxy server 164 then calls the Ad decisioning server 106a and replaces the non-programming content media segments or the filler media segments in the manifest and then delivers the manifest to the consumer devices 110a, . . . , 110n along with any data about the ads. In an embodiment, the proxy server 164 may be used for one or more consumer devices of the consumer devices 110a, . . . , 110n where the media player is fully controlled by a third party and does not support ad insertion. In such embodiment, ad blocking may be reduced which usually targets communication between the consumer devices 110a, . . . , 110n and the Ad decisioning server 106a. Further, the proxy server 164 may replace the pre-encoded placeholder content segments, such as slate content segments, with the advertisement content segments received from the Ad decisioning server 106a.

In operation, the broadcast network scheduler 132 may be configured to schedule programming content as a broadcast content schedule, based on various broadcast content parameters, such as, but not limited to, desired channel theme, content metadata, content rights, and competitive analysis of what competing programming is available on other channels. In accordance with an embodiment, the broadcast content schedule may correspond to one or more pre-encoded media assets and/or live input streams. The broadcast content schedule may correspond to live input streams in case a live event is included in the scheduled programming content. For the live content, the broadcast network scheduler 132 may be configured to access the content rights storage 138 to determine if the live input stream has any geo restrictions. Additionally or alternatively, the broadcast network scheduler 132 may be further configured to determine if the live input stream should be archived for re-play or made available On-Demand or as pre-encoded media asset. The broadcast network scheduler 132 may finalize the broadcast content schedule of the programming content and transmit the broadcast content schedule to the content processing system 121 and the traffic system 134.

The content processing system 121 may determine whether the scheduled programming content, such as a pre-encoded media asset, is available and has been processed to a correct format for distribution. In accordance with an embodiment, when the programming content is not available, the content processing system 121 may order the programming content. Accordingly, the content processing system 121 receives the programming content, assures the quality, and processes the programming content to a specific standard. The content processing system 121 may further store the processed programming content as media content asset in the media content master storage system 124. The content processing system 121 may further store the associated metadata in the media content metadata storage system 122.

In accordance with an embodiment, when the content processing system 121 determines that the scheduled programming content, such as a media content asset, is available in the media content master storage system 124, the master media content asset is retrieved from the media content master storage system 124. Further, metadata, such as media content asset duration and the location of non-programming content, such as ad breaks, credits, overlay opportunities, may be determined. Accordingly, the content encoder/packager 128 may be configured to encode the media content asset and packaged for web distribution. During encoding and packaging, the content encoder/packager 128 may mark the precise ad break locations and condition the media asset, such that the ad break locations fall on boundaries of media segments of the media content asset.

Further, the content encoder/packager 128 may insert tags to mark the credits and the potential overlay graphics locations in the media content asset. Additionally, the content encoder/packager 128 may encode and package one or more high quality profiles to support various broadcast use cases. Thus, the content encoder/packager 128 may encode and package the media content asset for web distribution. The media content asset is thus prepared for the web distribution and hereinafter referred to as pre-encoded media asset. The pre-encoded media asset and the corresponding manifest may be stored in the media storage 162 of the content delivery system 160.

The traffic system 134 may access the media content metadata storage system 122 to determine media content asset duration and break schedule and generate a schedule 111. The traffic system 134 may further determine the duration for each ad break to have the program end at correct scheduled time and have the new program start at the correct schedule time. In accordance with an embodiment, for live programs, an assumed number of ad breaks with different durations may be programmed but the exact time of the ad breaks or the duration may not be known.

In accordance with an embodiment, the ad sales team may provide sold ad campaigns and internal promotional campaigns information into the ad/promo campaign manager 114. The ad sales team may further provide a window for the campaigns along with desired audience demographics and segments, and ad versions.

The traffic system 134 may further communicate with the ad/promo campaign manager 114 to determine what ads and promotional content are available to be scheduled. In accordance with another embodiment, the traffic system 134 may schedule the ads to play to provide the highest yield based on historical performance. The traffic system 134 may further mark an entire ad break for a downstream replacement on a consumer device, for example the consumer device 110a, that may individually target an ad.

Upon receiving information from the ad/promo campaign manager 114, the content processing system 121 may determine whether new non-programming media content, such as the ads and promotional content are entered in the system 100. The content processing system 121 may further determine if the non-programming media content are already available and has been processed to a correct format. In accordance with an embodiment, when the non-programming content is not available, the content processing system 121 may order the non-programming content. Accordingly, the content processing system 121 receives the non-programming content, assures the quality, and processes the non-programming content to a specific standard. The content processing system 121 may further store the processed non-programming content in the ad/promo content master storage system 126.

In accordance with an embodiment, when the content processing system 121 determines that the scheduled non-programming content, such as ads and promotional content, is available in the ad/promo content master storage system 126, the non-programming content is retrieved from the ad/promo content master storage system 126. Accordingly, the content encoder/packager 128 may be configured to encode the non-programming content and package for web distribution. In accordance with an embodiment, the content encoder/packager 128 may further insert in-band triggers to identify the ad or promotional content, and provide a special instruction for tracking when such on-programming content is viewed. In accordance with another embodiment, the content encoder/packager 128 may include watermarks or in-band metadata to support program viewership measurements in broadcast use cases. The non-programming content prepared for web distribution, including the manifest, may be stored in the media storage 162 of the content delivery system 160.

For a pre-encoded media asset, the traffic system 134 may leverage channel preferences to determine when and what network logo to display, when to signal for overlay promotions, and the like. The traffic system 134 may generate the schedule 111 and provide schedule 111 to the indexing and storage system 148, the VPC system 115, the Live to On-Demand toolkit system 117, and the stream publishing engine 150.

In accordance with an embodiment, a live feed may be encoded and packaged according to defined system specifications and published directly into the content delivery system 160. Alternatively, for live events with limited bandwidth or technical capabilities, the live stream backhaul system 154 may encode a single live stream backhaul feed and deliver to the central ingest encode/package system 156. At the central ingest encode/package system 156, the single live stream backhaul feed may be processed and published for web distribution according to the defined system specifications.

The schedule 111 thus generated may include manifests for live input streams and/or pre-encoded media assets, and ads and promotional content, are ingested into the indexing and storage system 148. In accordance with an embodiment, a proprietary manifest format may be there between the content encoder/packager 128 and the indexing and storage system 148 when additional information carried in the published manifest is required to be passed (not traditionally).

The indexing and storage system 148 may index broadcast content segments from each manifest corresponding to the live input streams and/or pre-encoded media assets. The indexing and storage system 148 may log indicators indicating ad breaks, program start, program end, graphic overlays, and the like. The indexing and storage system 148 may further perform checks to validate that the live input streams and/or pre-encoded media assets are complete and ready for inclusion in the disparate live media output stream.

At the schedule time, the stream publishing engine 150 may generate a preview of the live input streams by inserting a new segment from the scheduled live input stream manifest into the preview manifest of the live input streams on an interval not greater than the previous content segment duration. The preview manifest that may address a Group of Pictures or Sub-Group of Pictures inside the media segments to allow a standard web player to operate closer to the live point of the disparate live media output stream. Alternatively, a custom player may be created that may buffer fewer media segments to keep the playback closer to the live point.

In accordance with an embodiment when all live feeds are backhauled to and encoded and packaged through central ingest encode/package system 156, a low latency preview of live input streams may be published directly to the VPC system 115 from the central ingest encode/package system 156. Such preview of live input streams may include an additional audio track, such as the assistant director which often includes a countdown to ad breaks and listing their duration for live events. An operator at the VPC system 115 may be configured to view the preview of live input streams. The operator may further listen to the alternative audio and may update the schedule 111 in real-time based on the live events in the preview of live input streams.

In accordance with an embodiment, the VPC system 115 may be configured to insert non-programming content, such as ads, previously defined by the traffic system 134 as well as a non-programming indicator, such as ad indicator, to mark the non-programming when the live event producer calls for an ad break. Further, the VPC system 115 may be configured to insert the non-programming indicator, such as the ad indicator and filler content, for the declared break duration. The filler content may be replaced with targeted ads by the consumer device, for example, the consumer device 110a, when the live event producer called for an ad break.

In accordance with an embodiment, the VPC system 115 may be configured to switch to an alternate live feed as the scheduled live event ended early or to get a different perspective of the live event. The VPC system 115 may be further configured to start the next pre-encoded media asset in the schedule 111 early as the live event ended early. The VPC system 115 may be further configured to insert filler program content as the live event ended early and the next event should be played as originally scheduled. The VPC system 115 may be further configured to delay the switch to the next pre-encoded media asset in the schedule 111 as the current event is running long or delay the switch to the next event in the schedule 111 as the current event is running long. The VPC system 115 may be further configured to insert graphical treatment, such as overlay graphics indicators, and/or programming indicators to signal program start and program end for live events in the live input stream manifest.

Accordingly, the stream publishing engine 150 may be configured to generate a preview of live input streams to the machine and/or human captioning system 119 if there is a live event requiring closed captions. In accordance with an embodiment, the VPC system 115 may receive the captioning data from the machine and/or human captioning system 119 and generate a live captions stream. The segmented caption files in the live captions stream may be published to the content delivery system 160. The caption stream manifest may be delivered to the stream publishing engine 150 to be published along with the other video and audio streams.

In accordance with an embodiment when all live feeds are backhauled to and encoded and packaged through the central ingest encode/package system 156, a low latency preview of live input streams may be published directly to the machine and/or human captioning system 119. The captions data may be returned and inserted during the web encode.

In accordance with an embodiment, the stream publishing engine 150 always checks the schedule 111 before determining the next media segment to publish. The stream publishing engine 150 may be configured to be one or more media segments behind any preview of live input streams. Thus, operator at the VPC system 115 is enabled to view the media content ahead of time, decide what should happen next, and update the schedule 111 accordingly. Further, time is provided for the captions to be more closely synchronized with the audio during live productions.

In accordance with an embodiment, the stream publishing engine 150 may be configured to generate a disparate live media output stream by inserting a new segment from the scheduled pre-encoded media asset manifest or the defined live input stream manifest (including the configured delay) into the disparate live media output stream manifest output on an interval not greater than the previous content segment duration. When the stream publishing engine 150 encounters indicators marking an ad break within the pre-encoded media asset manifest, in the live input stream manifest, in the original schedule 111, or added to the schedule 111 by the VPC system 115, the stream publishing engine 150 may insert ad indicators in the disparate live media output stream manifest and stitch in non-programming content, such as ads, promos or filler content, included in the schedule 111. In accordance with another embodiment, when the stream publishing engine 150 encounters indicators marking overlays within the pre-encoded media asset manifest, in the live input stream manifest, in the original schedule 111 or added to the schedule 111 by the VPC system 115, the stream publishing engine 150 may insert indicators in the disparate live media output stream manifest according to the schedule 111.

In accordance with an aspect of the disclosure, in case the schedule 111 indicates that a live event is to be captured for re-play or to create a pre-encoded media asset, the Live to On-Demand toolkit system 117 may be configured to capture the live input stream manifest for the defined scheduled time or between the program start and end indictors. The Live to On-Demand toolkit system 117 may be configured to communicate with the content delivery system 160 to move the media segments listed in the asset from the network edge. The media segments may be eventually be purged from the content delivery system 160 and moved to the more permanent media storage 162 inside the content delivery system 160.

As defined by the schedule 111, the Live to On-Demand toolkit system 117 may maintain the ad indicators marking the break locations but removing the originally scheduled ads or filler content from the archived pre-encoded media asset manifest. The ad breaks may be deleted, reduced in duration, or extended in duration during playback of the pre-encoded media asset or during a scheduled re-play of the live event in the disparate live media output stream manifest. The Live to On-Demand toolkit system 117 may be further configured to provide an interface for the operator to view the archived content and edit the manifest to add or move indicators, remove some media segments, and/or change some of the media segments referenced. The interface may be provided in case an ad break signal was missed or triggered at the wrong time, the program start and end is trimmed if the capture was based on time or a start or end trigger was missed, content is required to be removed for some reason and not to be included in the pre-encoded media asset or during a replay of the event, alternative audio segments are referenced with muted audio in case something was said in the live event that needs to be removed from the pre-encoded media asset or replay of the event, indictors for the credit start and end to be inserted if not included in the original event airing, overlay indicators to be inserted or removed if not included or improperly included in the original event airing.

In accordance with an embodiment, the Live to On-Demand toolkit system 117 may provide the interface for the operator to, extract, decrypt if necessary, and combine into a single file the highest quality profile for a defined range of media segments that need to be professionally edited. Accordingly, an operator may then download the combined file or edit the file remotely. The edited file may be submitted through the content processing system 121 and moved to the content delivery system 160. The edited and processed media segments may be referenced in place of the original media segments in the pre-encoded media asset for the archived live content. The final manifest for the archived live input stream may be ingested into the indexing and storage system 148 if the live input stream is scheduled for replay.

Figure 2A:
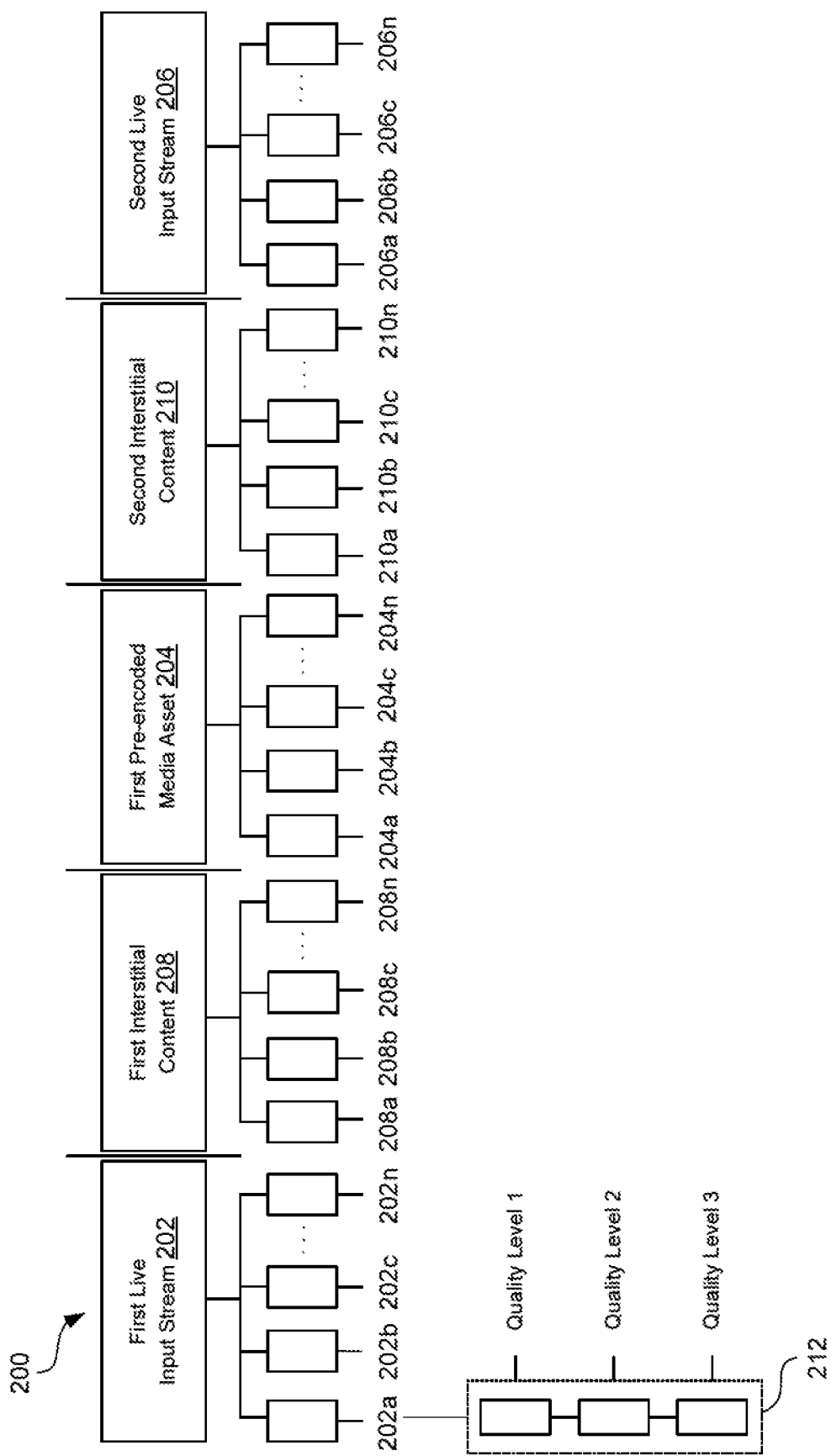
FIG. 2A illustrates segmentation of live input streams and pre-encoded media assets for the schedule for publishing a disparate live media output stream that complies with distribution format regulations, in accordance with an exemplary embodiment of the disclosure.

FIG. 2A illustrates segmentation of live input streams and pre-encoded media assets for the schedule 111 for publishing a disparate live media output stream that complies with distribution format regulations, in accordance with an exemplary embodiment of the disclosure. Referring to the exemplary arrangement of FIG. 2A, there is shown a first live input stream 202, a first pre-encoded media asset 204, and a second live input stream 206. There is also shown a targeted first interstitial content 208 scheduled after the first live input stream 202, and a second interstitial content 210 scheduled after the first pre-encoded media asset 204. The first live input stream 202 may be segmented into a first set of video segments 202a, 202b, 202c, ..., 202n. Similarly, the first pre-encoded media asset 204 and the second live input stream 206 may also be segmented into second set of video segments 204a, 204b, 204c, ..., 204n, and third set of video segments 206a, 206b, 206c, ..., 206n respectively. By way of example, the segmentation may be executed by a segmenting system (not shown) during a preparation stage of the media assets. In accordance with an embodiment, the segments of the first set of video segments 202a, 202b, 202c, ..., 202n, the second set of video segments 204a, 204b, 204c, ..., 204n, and third set of video segments 206a, 206b, 206c, ..., 206n, may be segmented into consistent length, for example, 10 seconds segments. It may be advantageous to have a consistent and smaller file size of segments to be able to quickly push to the content delivery system 160, and also for quick downloading by a media player at the end-user side, such as on the consumer device 110a.

It should be understood by those skilled in the art that various changes may be made and segments of different file sizes (or length) may be used without departure from the scope of the present disclosure. Further, other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the schedule 111 may be possible with respect to interstitial content items, such as the first interstitial content 208 and the second interstitial content 210. In accordance with an embodiment, the first interstitial content 208 and the second interstitial content 210 may correspond to non-programming content, such as ads or promotional content targeted for the consumer device 110a.

The insertion of the live input stream manifests, pre-encoded media asset manifests, the interstitial content items may be done on-the-fly based on dynamic scheduling resulting in the schedule 111. The insertion may be driven by real-time or near-real-time content context analysis, user-selection on the consumer device 110a, or driven by external data received from the external data source 120. The stream publishing engine 150 may be configured to insert live input streams (such as the first live input stream 202 and the second live input stream 206), pre-stored media assets (such as the first pre-encoded media asset 204), and interstitial content items (such as the first interstitial content 208 and the second interstitial content 210), in the disparate live media output stream based on manipulation of the disparate live media output stream manifest for corresponding live channel.

In accordance with an embodiment, each segment of the first set of video segments 202a, 202b, 202c, ..., 202n, the second set of video segments 204a, 204b, 204c, ..., 204n, and third set of video segments 206a, 206b, 206c, ..., 206n, may be further processed to be stored at various quality levels, and content encryption modes for the purposes of adaptive bitrate streaming and digital rights management, for example, the video segment 202a may be stored in a plurality of quality levels or profiles, for example, high definition (HD), high dynamic range (HDR) video, or different quality levels in accordance with specified pixel resolutions, bitrates, frame rates, and/or sample frequencies. Each of the media content, such as 202 to 206, are encoded, segmented, and stored with the plurality of quality levels in the media content master storage system 124. The media content may be re-used to create new variant channels, such as a new variant of the disparate live media output stream, without having to re-encode a selected live input stream or a pre-encoded media asset when the new variant of the disparate live media output stream is created by the stream publishing engine 150.

For the sake of brevity, and with reference to FIG. 2A, there is shown an example of publishing the disparate live media output stream based on dynamic insertion of interstitial content items by the stream playout and distribution system 112 of FIG. 1B. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the consumer devices 110a, ..., 110n, based on at least the desired delivery method, delivery conditions, content protection requirements, to satisfy operational and technical requirements, as needed. The operational and technical requirements may include, but are not limited to, media encoding, media segmentation, schedule 111 (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. In other cases, for example, the stream publishing engine 150 may exclude the one or more high quality profiles provided to support broadcast use cases, or exclude one or more profiles created for consumer distribution. In some other cases, the content encoder/packager 128 may encode and package one or more high quality profiles to support broadcast use cases or include one or more high quality profiles of interstitial content items for the encoded and packaged pre-encoded media asset to support broadcast use cases. Further, based on different operational and technical requirements, publishing of the disparate live media output stream may be different. As descried above, the media content that is prepared and distributed may include both the programming content, such as long-form presentations, short-form presentations, news or sporting events; and non-programming content, such as paid advertisements, public service advertisements, or promotional material.

Figure 2B:
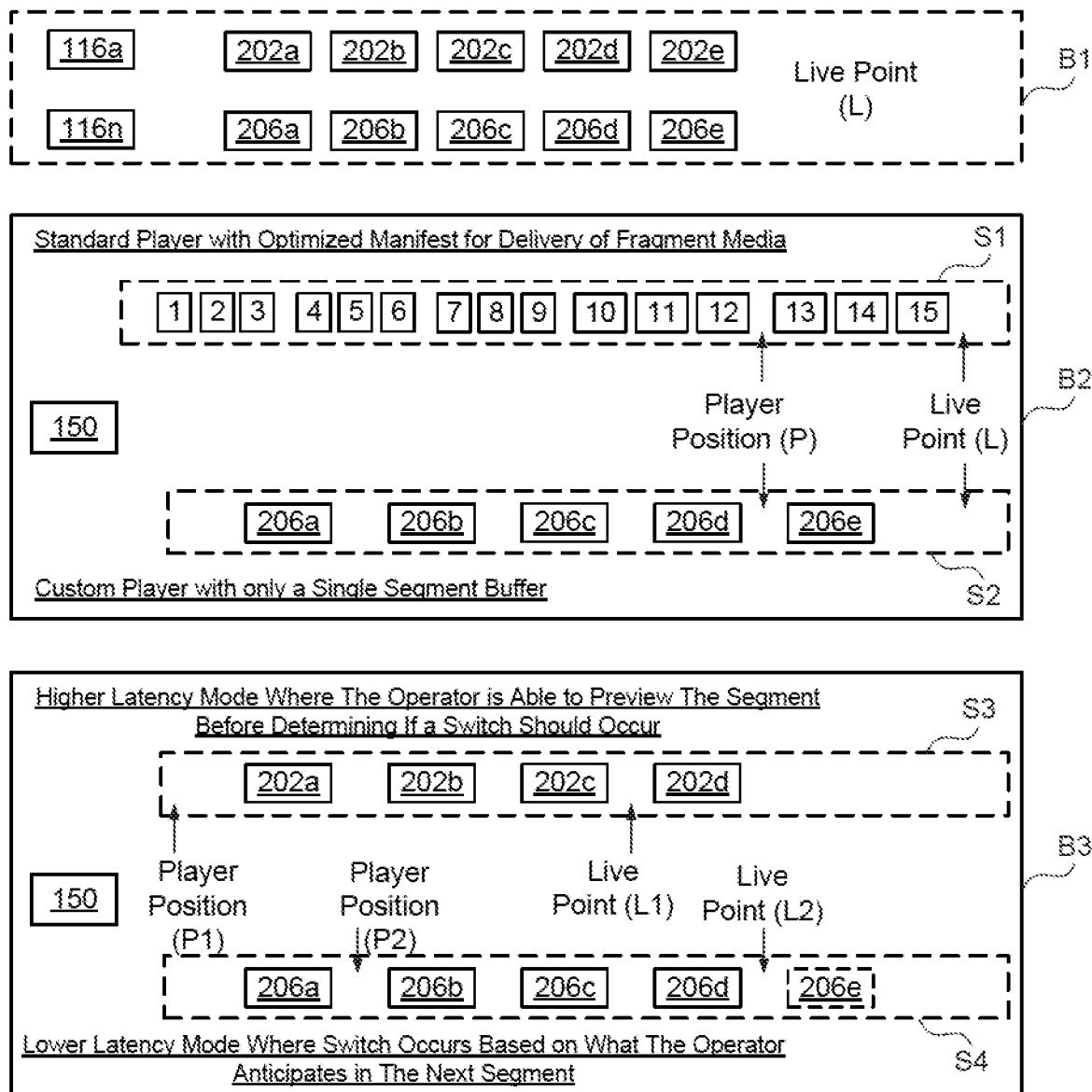
FIG. 2B illustrates various exemplary scenarios to virtualize production control functions, in accordance with an exemplary embodiment of the disclosure.

FIG. 2B illustrates various exemplary scenarios to virtualize production control functions, in accordance with an exemplary embodiment of the disclosure. In order to enable the VPC system 115 to be virtualized by not being located at the same location, such as a studio, the VPC system may be required to receive the live input streams ahead of time. In accordance with an embodiment, it may be done through pure manifest manipulation. In accordance with an embodiment, based on the web or media players, the media segments may be of a fixed duration, for example 10 seconds or 2 seconds long in case of modern web streaming protocols. A client, for example the first consumer device 110a, may want to buffer three media segments before playback is started. Thus, three media segments may be required to be downloaded to be three media segments ahead or playback three media segments behind the live point.

In accordance with an embodiment, as described in FIG. 2A and illustrated in block B1 of FIG. 2B, the un-manipulated first live input stream 202 may be segmented by a first live stream encoder/packager 116a into a first set of video segments 202a, 202b, 202c, 202d, and 202e. Further, the second live input stream 206 may be segmented by a second live stream encoder/packager 116n into a third set of video segments 206a, 206b, 206c, 206d, and 206e. In accordance with the exemplary scenario, a live point may be located after five media segments from each of the first and second sets of video segments that are provided by the content delivery system 160.

Block B2 illustrates manipulated version of the live input streams generated by the stream publishing engine for virtual master preview that is close to the live point L. Segment set S1 corresponds to standard player with optimized manifest for delivery of fragmented media, such as byte range references to individual segments. Segment set S2 corresponds to a custom player with a single segment buffer. This may give a player position (P) one segment behind the live point (L).

Block B3 illustrates manipulated manifests published by the stream publishing engine for consumer delay. Segment set S3 corresponds to a higher latency mode were the operator previews the segment before determining whether switch should occur or not. Segment set S4 corresponds to a lower latency mode where switch occurs based on what the operator anticipated in the next segment. 'Segment 4' in segment set S3 and 'Segment 5' in segment set S4, respectively, are not published yet that may correspond to a decision point to perform one of: continue live input stream, insert ad, insert pre-encoded media asset, or switch to an alternate stream. In case of higher latency mode, player position (P1) is behind 'Segment 1' and is three segments behind the live point (L1). Further, in case of lower latency mode, player position (P2) is behind 'Segment 2' and is again three segments behind the live point (L2).

Figure 3:
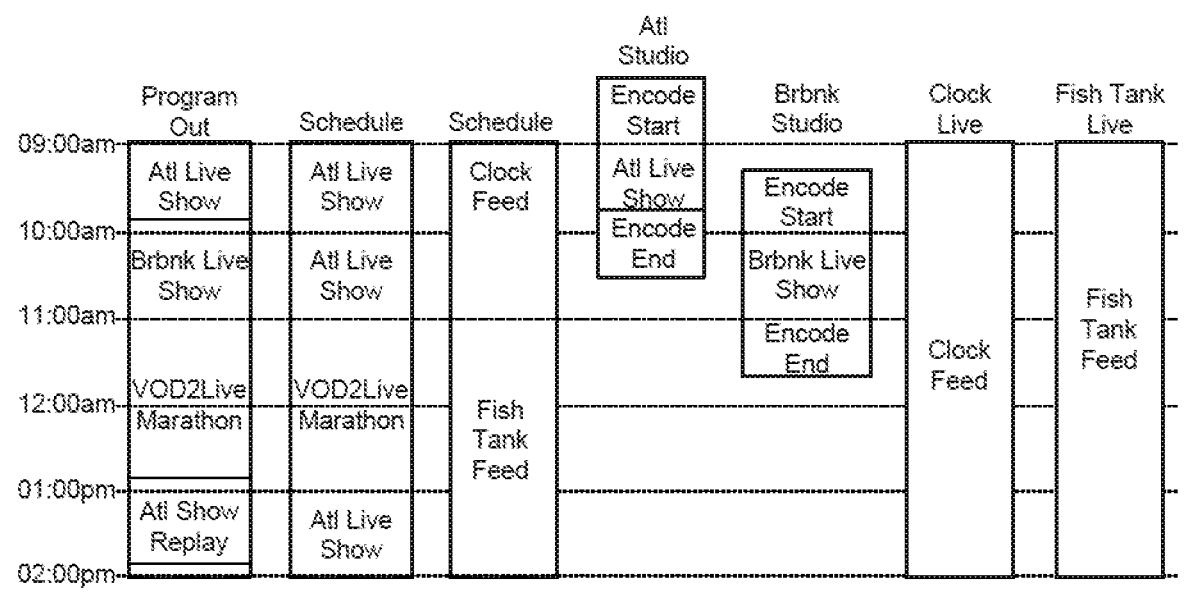

FIG. 3 illustrates an exemplary scenario associated with a disparate live media output stream that complies with distribution format regulations by the VPC system 115, in accordance with an exemplary embodiment of the disclosure. Referring to the exemplary scenario in FIG. 3, there are shown a schedule of live input streams and pre-encoded media assets corresponding to defined timestamps generated by the broadcast network scheduler 132. In accordance with the exemplary scenario, the Adult Swim live show from Atlanta (Atl) studio may be scheduled from 9:00 am to 10:00 am, live show from Burbank (Brbnk) studio may be scheduled from 10:00 am to 11:00 am, and a pre-recorded marathon of a show may be scheduled from 11:00 am to 1:00 pm. From 1:00 pm-2:00 pm, a replay of the 9:00 am Adult Swim live show from Atlanta studio may be scheduled.

The On-Demand content, for example the pre-recorded marathon of the show, if not already created, is transmitted to the content processing system 121 to get encoded and packaged and delivered to the content delivery system 160 before being published. The traffic system 134 may be configured to determine various duration of ad breaks based on available time and preferences. For example, for each hour of the pre-recorded marathon of the show of two episodes (which without ads may total up to 42 minutes), the traffic system 134 may determine a duration of 18 minutes of ads and promos to fill up the available time duration of 18 minutes. Thus, the traffic system 134 may be generated the schedule 111 comprising programming content (such as the live input streams and pre-encoded media assets) and non-programming content (such as ads, promos, or filler content) and allow the customer devices insert the ads through the proxy server 164.

In accordance with an embodiment, as described in FIG. 1B, the scheduled live events in the live input streams that are fed to the live stream encoder/packager 116, a backhaul version may be added. For example, if bandwidth is available, live stream encoding and packaging of the live input streams from the Atlanta studio and the Burbank studio may be done at the respective locations to create for example, 9 profiles. However, in live sporting events, in case of insufficient bandwidth, the highest quality feed may be provided to an encoding and packaging location as single profile, which is the live stream backhaul system 154. The encoded and packaged single backhaul stream may be ingested to the central ingest encode/package system 156, which may be onsite or correspond to Amazon®. The central ingest encode/package system 156 may perform encoding and packaging to required bit rates and specifications that are required for the content delivery system 160, which is further transmitted to the indexing and storage system 148. The indexing and storage system 148 may index each segment of the live input streams and pre-encoded media assets. Then the stream publishing engine 150 may switch between sources that have segment duration of, for example 2 seconds, based on the schedule 111, and accordingly publishes various live input streams and pre-encoded media assets as a disparate live media output stream "Program out manifest" scheduled per the schedule 111. In accordance with an embodiment, the VPC system 115 may update the schedule 111 to insert an ad break for, for example 120 seconds, which is continuously referred to by the stream publishing engine 150. For example, the production director associated with the VPC system 115 may signal for an ad break of 2 minutes. After 10 minutes, the production director may signal for another ad break.

In accordance with an embodiment, the Atlanta Live show may end at 9:54 am instead of 10:00 am. The production director may signal that the Atlanta Live show has ended and the program may be switched for 6 minutes to an alternate live feed, for example a camera set up corresponding to a clock feed. At 10:00 am, program may be switched to the Burbank Live show. In case not available, filler content may be played out. Thus, the VPC 115 has an access to all the programming and non-programming content and in near-real time may update the schedule 111 to switch between different programming and non-programming content.

Figure 4A:
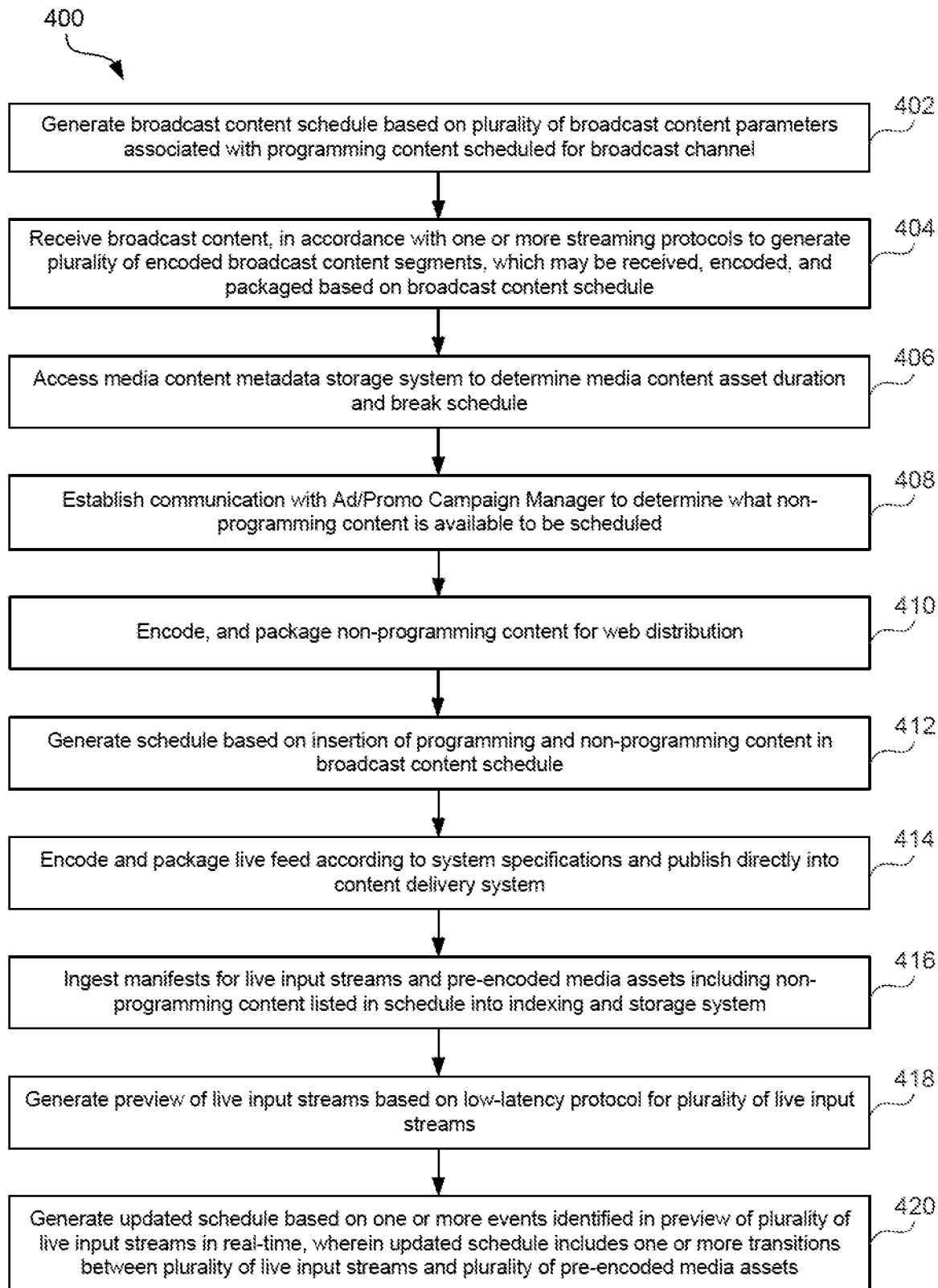
FIGS. 4A and 4B collectively depict a flowchart illustrating exemplary operations for publishing a disparate live media output stream that complies with distribution format regulations by the media packaging and distribution system of FIG. 1B, in accordance with an exemplary embodiment of the disclosure.
Figure 4B:
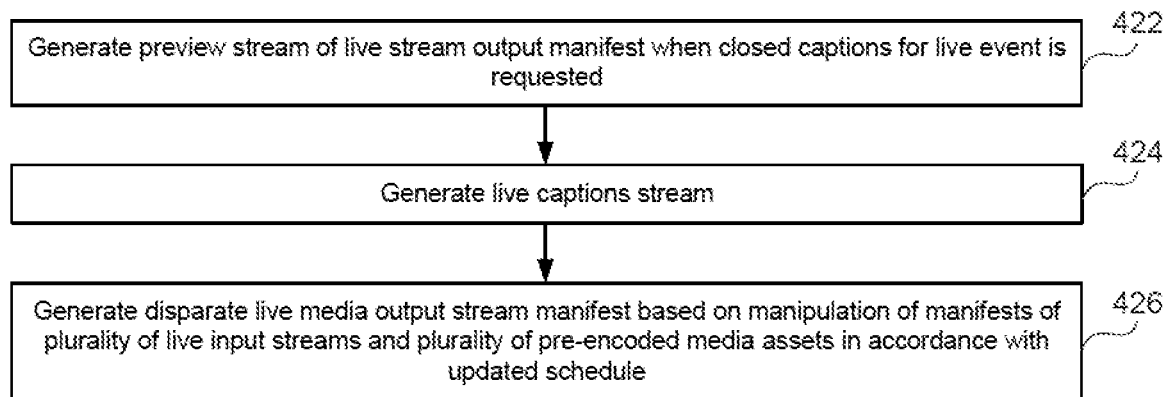

FIGS. 4A and 4B collectively depict a flowchart illustrating exemplary operations for publishing a disparate live media output stream that complies with distribution format regulations by the media packaging and distribution system 102 of FIG. 1B, in accordance with an exemplary embodiment of the disclosure.

At 402, a broadcast content schedule may be generated based on a plurality of broadcast content parameters associated with the programming content scheduled for a broadcast channel. In accordance with an embodiment, the broadcast network scheduler 132 may be configured to a generate the broadcast content schedule for scheduling the programming content based on the plurality of broadcast content parameters, such as, but not limited to, desired channel theme, content metadata, content rights, and competitive analysis of what competing programming is available on other channels. The broadcast network scheduler 132 may receive the plurality of broadcast content parameters from the content rights storage 138, the historical performance storage 140, the competitive analysis storage 142, and the channel preference storage 144 in the schedule planning database 136.

The broadcast content schedule may correspond to live input streams in case a live event is included in the scheduled programming content. For the live content, the broadcast network scheduler 132 may be configured to access the content rights storage 138 to determine if the live input stream has any geo restrictions. Additionally or alternatively, the broadcast network scheduler 132 may be further configured to determine if the live input stream should be archived for re-play or made available On-Demand or as pre-encoded media asset. The broadcast network scheduler 132 may finalize the broadcast content schedule of the programming content and transmit the broadcast content schedule to the content processing system 121 and the traffic system 134.

At 404, broadcast content, in accordance with one or more streaming protocols to generate a plurality of encoded broadcast content segments, which may be received, encoded, and packaged based on the broadcast content schedule. In an embodiment, the content encoder/packager 128 in the content processing system 121 may be configured to receive, encode, and package broadcast content (or programming content), in accordance with one or more streaming protocols to generate a plurality of encoded broadcast content segments, based on the broadcast content schedule. Specifically, when the programming content is not available, the content encoder/packager 128 in the content processing system 121 may retrieve the programming content, for example, media content asset, from the media content master storage system 124, assures the quality, and processes the programming content to a specific standard.

The content encoder/packager 128 may further insert in-band triggers to mark the location of the ad breaks, credits, and potential overlay graphic locations for protocols that do not constantly query the manifest for new information but instead calculate the next content to be downloaded based on a defined algorithm. In accordance with another embodiment, the content encoder/packager 128 may include watermarks or in-band metadata to support program viewership measurements in broadcast use cases. The media content asset is thus prepared for the web distribution and hereinafter referred to as pre-encoded media asset. The pre-encoded media asset and the corresponding manifest may be stored in the media storage 162 of the content delivery system 160.

At 406, the media content metadata storage system 122 may be accessed to determine media content asset duration and break schedule. In accordance with an embodiment, the traffic system 134 may be configured to access the media content metadata storage system 122 to determine media content asset duration and break schedule. The traffic system 134 may further determine the duration for each ad break to have the program end at correct scheduled time and have the new program start at the correct schedule time. In accordance with an embodiment, for live programs, an assumed number of ad breaks with different durations may be programmed but the exact time of the ad breaks or the duration may not be known.

At 408, communication with the Ad/promo campaign manager 114 may be established to determine what non-programming content is available to be scheduled. In accordance with an embodiment, the traffic system 134 may be configured to communicate with the Ad/promo campaign manager 114 to determine what non-programming content is available to be scheduled. In accordance with an embodiment, the ad sales team may provide sold ad campaigns and internal promotional campaigns information into the ad/promo campaign manager 114. The ad sales team may further provide a window for the campaigns along with desired audience demographics and segments, and ad versions.

In accordance with an embodiment, the traffic system 134 may schedule the ads to play to provide the highest yield based on historical performance. The traffic system 134 may further mark an entire ad break for a downstream replacement on a consumer device, for example the consumer device 110a, that may individually target an ad.

Upon receiving information from the ad/promo campaign manager 114, the content processing system 121 may determine whether new non-programming media content, such as the ads and promotional content are entered in the system. The content processing system 121 may further determine if the non-programming media content are already available and has been processed to a correct format. In accordance with an embodiment, when the non-programming content is not available, the content processing system 121 may order the non-programming content. Accordingly, the content processing system 121 receives the non-programming content, assures the quality, and processes the non-programming content to a specific standard. The content processing system 121 may further store the processed non-programming content in the ad/promo content master storage system 126.

At 410, the non-programming content may be received, encoded, and packaged for web distribution. In accordance with an embodiment, when the content processing system 121 determines that the scheduled non-programming content, such as ads and promotional content, is available in the ad/promo content master storage system 126, the non-programming content is retrieved from the ad/promo content master storage system 126. Accordingly, the content encoder/packager 128 may be configured to encode the non-programming content and package for web distribution. In accordance with an embodiment, the content encoder/packager 128 may insert in-band triggers to identify the ad or promotional content and provide special instructions for tracking when it is viewed. In accordance with another embodiment, the content encoder/packager 128 may include watermarks or in-band metadata to support ad and promotional content viewership measurements in broadcast use cases. The non-programming content may be prepared for web distribution and may be stored in the media storage 162 of the content delivery system 160. In accordance with an embodiment, for a pre-encoded media asset, the traffic system 134 may leverage channel preferences to determine when and what network logo to display, when to signal for overlay promotions, and the like.

At 412, the schedule 111 may be generated based on insertion of a schedule for programming and non-programming content in the broadcast content schedule. In accordance with an embodiment, the traffic system 134 may access the media content metadata storage system 122 to determine media content asset duration and break schedule and generate the schedule 111. Thus, the schedule 111 includes the schedule for the one or more non-programming content and/or one or more programming content. In other words, the schedule 111 may include manifests for live input streams and/or pre-encoded media assets, and ads and promotional content. In accordance with an embodiment, the schedule 111 for the one or more non-programming content and the one or more programming content may be generated based on the content viewing demographics.

Prior to generation of the schedule 111, as discussed above, the content processing system 121 may determine whether the non-programming media content, such as the ads and promotional content, and the programming content are available and have been processed to a correct format. In accordance with an embodiment, when the non-programming content is not available, the content processing system 121 may order the non-programming content. Accordingly, the content processing system 121 receives the non-programming content, assures the quality, and processes the programming and non-programming content to a specific standard. The content processing system 121 may further store the processed programming and non-programming content in the media content master storage system 124 and the ad/promo content master storage system 126, respectively. Accordingly, the content encoder/packager 128 in the content processing system 121 may retrieve the programming content from the media content master storage system 124, and the non-programming content from the ad/promo content master storage system 126. The content encoder/packager 128 may further encode and package the programming and the non-programming content for web distribution.

In accordance with various embodiments, the traffic system 134 may provide the schedule 111 to the indexing and storage system 148, the VPC system 115, the Live to On-Demand toolkit system 117, and the stream publishing engine 150.

At 414, a live feed may be encoded and packaged according to the system specifications and published directly into the content delivery system 160. In accordance with an embodiment, the live stream encoder/packager 116 may be configured to encode and package a plurality of live feeds, into a plurality of live input streams, according to the system specifications and published directly into the content delivery system 160. Alternatively, for live events with limited bandwidth or technical capabilities, a single live stream backhaul feed may be encoded and delivered to the central ingest encode/package system 156. In accordance with an embodiment, the live stream backhaul system 154 may encode the single live stream backhaul feed and deliver to the central ingest encode/package system 156. At the central ingest encode/package system 156, the single live stream backhaul feed may be processed and published for web distribution according to the defined system specifications.

At 416, manifests for the live input streams and pre-encoded media assets including non-programming content listed in the schedule 111 may be ingested into the indexing and storage system 148. In accordance with an embodiment, the indexing and storage system 148 may be configured to ingest the manifests for the live input streams live feeds and pre-encoded media assets including non-programming content listed in the schedule 111. In accordance with an embodiment, a proprietary manifest format may be there between the content encoder/packager 128 and the indexing and storage system 148 when additional information carried in the published manifest is required to be passed (not traditionally).

The indexing and storage system 148 may index broadcast content segments from each manifest corresponding to the live input streams and/or pre-encoded media assets. The indexing and storage system 148 may log indicators indicating ad breaks, program start, program end, graphic overlays, and the like. The indexing and storage system 148 may further perform checks to validate that the live input streams and/or pre-encoded media assets are complete and ready for inclusion in the disparate live media output stream.

At 418, a preview of live input streams based on a low-latency protocol may be generated for a plurality of live input streams. In accordance with an embodiment, the stream publishing engine 150 may generate a preview of the live input streams based on the low-latency protocol. The preview may be generated based on an insertion of a new segment from the scheduled live input stream manifest into the preview manifest of the live input streams on an interval not greater than the previous content segment duration.

The preview of the live input streams that may address a Group of Pictures or Sub-Group of Pictures inside the media segments to allow a standard web player to operate closer to the live point of the disparate live media output stream. Alternatively, a custom player may be created that may buffer fewer media segments to keep the playback closer to the live point.

In accordance with an embodiment when all live feeds are backhauled to, and encoded and packaged through the central ingest encode/package system 156, a low latency preview of live input stream may be published directly to the VPC system 115 from the central ingest encode/package system 156. In accordance with an embodiment, the plurality of live input streams may include additional audio content that may identifies location and duration of a non-programming content for live events that correspond to the plurality of live input streams. For example, such preview of live input stream may include an additional audio track, such as the assistant director which often includes a countdown to ad breaks and listing their duration for live events. An operator at the VPC system 115 may be configured to view the preview of live input streams. The operator may further listen to the alternative audio and may update the schedule 111 in real-time based on the live events in the preview of live input streams.

In accordance with an embodiment, the preview for the plurality of live input stream may be generated based on a low-latency protocol during original encode of the live input stream.

In accordance with an embodiment, the stream publishing engine 150 may be configured to provide the generated preview of the plurality of live input streams that comprises audio content to the machine and/or human captioning system 119. The machine and/or human captioning system 119 may generate programming content that includes live captions for one or more non-captioned live events At 420, an updated schedule may be generated based on one or more events identified in the preview of the plurality of live input streams in real-time, wherein the updated schedule includes one or more transitions between the plurality of live input streams and a plurality of pre-encoded media assets. In accordance with an embodiment, the VPC system 115 may be configured to generate the updated schedule based on one or more events identified in the preview of the plurality of live input streams in real-time, wherein the updated schedule includes one or more transitions between the plurality of live input streams and the plurality of pre-encoded media assets. For example, the operator associated with the VPC system 115 may view the preview of the plurality of live input streams including listening to the alternative audio and may update the schedule 111 in real time based on the events in the preview.

In accordance with an embodiment, the operator associated with the VPC system 115 may mark a beginning and an end of a live event in an index of the live input streams based on the generated preview. The operator associated with the VPC system 115 may include the marked live event in the at least one of the plurality of live input streams on live or on delay according to the updated schedule for disparate live media output stream manifest. Accordingly, the Live to On-Demand toolkit system 117 may convert the marked live event in the at least one of the plurality of live input streams to a pre-encoded media asset of the plurality of pre-encoded media assets to support one of a replay or a delay of the marked live event to a time beyond when media segments remain available in a content delivery system and an index of the manifest of the live input stream remains in the media storage 162.

In accordance with various embodiments, the generated updated schedule may indicate insertion of a non-programming content indicator and trafficked non-programming content for a specified duration of a non-programming content break, and insertion of the non-programming content indicator and filler content for the specified duration of the non-programming content break which allows a consumer device to replace the filler content with targeted non-programming content. The generated updated schedule may further indicate a switch to an alternate live input stream due to one or more of: technical defects, a live event ended on a current live input stream ahead of scheduled time, and/or a provision of a different vantage point for the live event. The generated updated schedule may further indicate insertion of a filler program content as a first live event ended before scheduled time and the next event has not yet started, and/or a start of the next event ahead of schedule if the first live event ended early. The generated updated schedule may further indicate a delay to switch to a next scheduled live input stream or a pre-encoded media asset if current live event runs for a time period that exceeds a threshold time period, insertion of a graphical treatment indicator to be inserted at the consumer device, and/or insertion of a programming content indicator to mark a beginning or an end of a live event in the disparate live media output stream manifest.

At 422, a preview stream of the live stream output manifest may be generated when closed captions for a live event is requested. In accordance with an embodiment, the stream publishing engine 150 may be configured to generate the preview stream of the live stream output manifest when the closed captions for the live event are requested. The stream publishing engine 150 may be configured to communicate the preview stream of the live stream output manifest to the machine and/or human captioning system 119.

At 424, a live captions stream may be generated. In accordance with an embodiment, the VPC system 115 may be configured to generate the live captions stream. The segmented caption files in the live captions stream may be published to the content delivery system 160. The caption stream manifest may be delivered to the stream publishing engine 150 to be published along with the other video and audio streams.

At 426, a disparate live media output stream manifest may be generated based on manipulation of manifests of a plurality of live input streams and plurality of pre-encoded media assets in accordance with updated schedule. In accordance with an embodiment, the stream publishing engine 150 may be configured to generate the disparate live media output stream manifest based on manipulation of manifests of a plurality of live input streams and plurality of pre-encoded media assets in accordance with updated schedule.

In accordance with an embodiment, the generated disparate live media output stream manifest may be delayed to allow decisions based on the previewed plurality of live input streams in a disparate live media output stream. The disparate live media output stream may include programming content and non-programming content available to the one or more processors for immediate consumption. Further, the disparate live media output stream complies with distribution format regulations. The distribution format regulations complies with Federal Communications Commission (FCC) standards regarding closed captioning (in case of broadcast or Internet streaming), TV ratings, information, marked ratings, inclusion and complies with stream owner/operator requirements for network logos and identification.

During the generation of the disparate live media output stream, the stream publishing engine 150 may encounter indicators marking an ad break within the pre-encoded media asset manifest, in the live input stream manifest, in the original schedule 111, or added to the schedule 111 by the VPC system 115. Accordingly, the stream publishing engine 150 may insert ad indicators in the disparate live media output stream manifest and stitch in non-programming content, such as ads, promos or filler content, included in the schedule 111. In accordance with another embodiment, when the stream publishing engine 150 encounters indicators marking overlays within the pre-encoded media asset manifest, in the live input stream manifest, in the original schedule 111 or added to the schedule 111 by the VPC system 115, the stream publishing engine 150 may insert indicators in the disparate live media output stream manifest according to the schedule 111.

Figure 5:
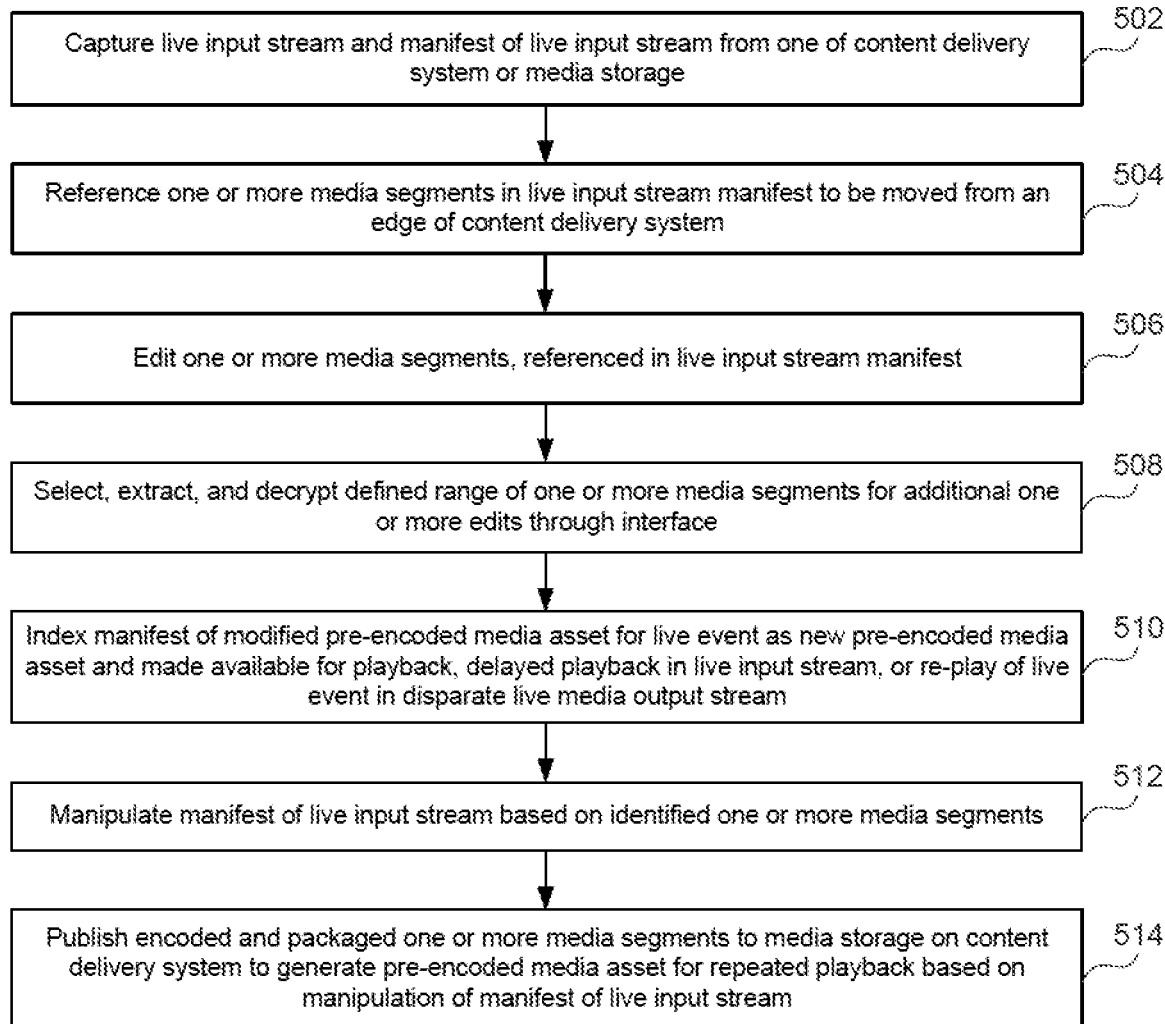
FIG. 5 depicts another flowchart illustrating exemplary operations for publishing a disparate live media output stream that complies with distribution format regulations by the media packaging and distribution system of FIG. 1B, in accordance with an exemplary embodiment of the disclosure.

FIG. 5 depicts another flowchart illustrating exemplary operations for publishing a disparate live media output stream that complies with distribution format regulations by the media packaging and distribution system 102 of FIG. 1B, in accordance with an exemplary embodiment of the disclosure.

At 502, a live input stream and a manifest of the live input stream may be captured from one of the content delivery system 160 or the media storage 162. In accordance with an embodiment, the Live to On-Demand toolkit system 117 may be configured to capture the live input stream manifest for the defined scheduled time or between the program start and end indictors. The Live to On-Demand toolkit system 117 captures the live input stream manifest when the schedule 111 is defined to indicate whether an event in the live input stream is to be captured for re-play or to create pre-encoded media asset.

At 504, one or more media segments may be referenced in the live input stream manifest to be moved from an edge of the content delivery system 160. In accordance with an embodiment, the Live to On-Demand toolkit system 117 may be configured to communicate with the content delivery system 160 to move the media segments listed in the asset from the network edge. The media segments may be eventually be purged from the content delivery system 160 and moved to the more permanent media storage 162 inside the content delivery system 160.

In accordance with an embodiment, as defined by the schedule 111, the Live to On-Demand toolkit system 117 may maintain the ad indicators marking the break locations but removing the originally scheduled ads or filler content from the archived pre-encoded media asset manifest. The ad breaks may be deleted, reduced in duration, or extended in duration during playback of the pre-encoded media asset or during a scheduled re-play of the live event in the disparate live media output stream manifest.

At 506, the one or more media segments, referenced in the live input stream manifest, may be edited. In accordance with an embodiment, the Live to On-Demand toolkit system 117 may be configured to edit the one or more media segments referenced in the live input stream manifest. The Live to On-Demand toolkit system 117 may provide an interface for the operator to view the archived content and edit the manifest to add or move indicators, remove some media segments, and/or change some of the referenced one or more media segments.

The interface may be provided in case an ad break signal was missed or triggered at the wrong time. The program start and end may be trimmed if the capture was based on time or a start or end trigger was missed. Content that for some reason is not to be included in the pre-encoded media asset or during a replay of the live event may be removed. Alternative audio segments may be referenced with muted audio in case something was said in the live event that needs to be removed from the pre-encoded media asset or replay of the event. Indictors for the credit start and end may be inserted if not included in the original event airing. Further, overlay indicators may be inserted or removed if not included or improperly included in the original event airing.

At 508, a defined range of the one or more media segments may be selected, extracted, and decrypted for additional one or more edits through the interface. In accordance with an embodiment, the Live to On-Demand toolkit system 117 may be configured to select, extract, and decrypt the defined range of the one or more media segments for additional one or more edits through the interface. In such case, upon viewing by a human or machine, the defined range of media segments may be selected for additional editing beyond the capabilities of simple manifest manipulation.

The selected, extracted, and decrypted defined range of the one or more media segments may correspond to the highest quality profile and may be combined into a file format that correspond to one or more of a single video file, a single audio file for each audio track, and a single caption file for each supported language in case of a preferred file format over the one or more media segments in the defined range. The Live to On-Demand toolkit system 117 may download the file format for the defined range and edit locally or remotely based on a video editing program, and submit the edited file through the content processing system 121 and moved to the content delivery system 160. The edited and processed media segments may be referenced in place of the original media segments in the pre-encoded media asset for the archived live content. In accordance with an embodiment, the Live to On-Demand toolkit system 117 may be further configured to encode the edited one or more media segments and package to match specifications of the live input stream.

At 510, the manifest of the modified pre-encoded media asset for a live event may be indexed as a new pre-encoded media asset and made available for a playback, a delayed playback in the live input stream, or a re-play of the live event in the disparate live media output stream. In accordance with an embodiment, the indexing and storage system 148 may be configured to index the manifest of the modified pre-encoded media asset for a live event as the new pre-encoded media asset and made available for a playback, a delayed playback in the live input stream, or a re-play of the live event in the disparate live media output stream.

At 512, the manifest of live input stream may be manipulated based on identified one or more media segments. In accordance with an embodiment, the stream publishing engine 150 may be configured to manipulate a manifest of the generated pre-encoded media asset for the live event to replace references to the original one or more media segments with the newly created edited one or more media segments. The manifest may be manipulated due to one or more factors. For example, the manifest may be manipulated for a removal of references to the one or more media segments prior to a live event start indicator and after a live event end indicator. The manifest may be manipulated to maintain indicators that mark locations of a non-programming content and removal of duration information and at least one referenced media segment that corresponds to originally schedule non-programming content. The manifest may be manipulated when the duration of the non-programming content is defined when generated pre-encoded media asset is played back or repeatedly played back. The manifest may be further manipulated based on insertion of one or more indicators that mark a location of a live event start and end and removal of references to the one or more media segments prior to the live event start and after the live event end in case the capture was based on a scheduled time that was inaccurate or an indicator which marks that the live event start or end was missed. The manifest may be further manipulated to insert the one or more indicators that mark locations of non-programming content and a removal of the referenced one or more media segments for originally scheduled non-programming content in case an indicator for a non-programming content was missed. The manifest may be further manipulated for a movement of an indicator that marks an event if was inaccurately aligned with media content and removal of the references to a desired media segment based on a new location of the event indicator. The manifest may be further manipulated to facilitate removal of the references to the one or more media segments that are to be excluded in the generated pre-encoded media asset, a delayed play of the live event, or a replay of the live event. The manifest may be further manipulated for a replacement of original audio media segments with alternative audio media segments. The alternative audio media segments may correspond to segments with muted audio if a portion of an audio content is to be excluded in the generated pre-encoded media asset, a delayed play of the live event, or a re-play of the live event. The manifest may be further manipulated to facilitate an insertion or a movement of the one or more indicators that mark graphical treatment if originally unmarked or improperly aligned with the media content in the live input stream.

At 514, the encoded and packaged one or more media segments may be published to the media storage 162 on the content delivery system 160 to generate pre-encoded media asset for repeated playback based on manipulation of manifest of live input stream. In accordance with an embodiment, the stream publishing engine 150 may be further configured to publish the encoded and packaged one or more media segments to the media storage 162 on the content delivery system 160. Accordingly, a pre-encoded media asset for repeated playback based on manipulation of manifest of live input stream may be generated.

Figure 6:
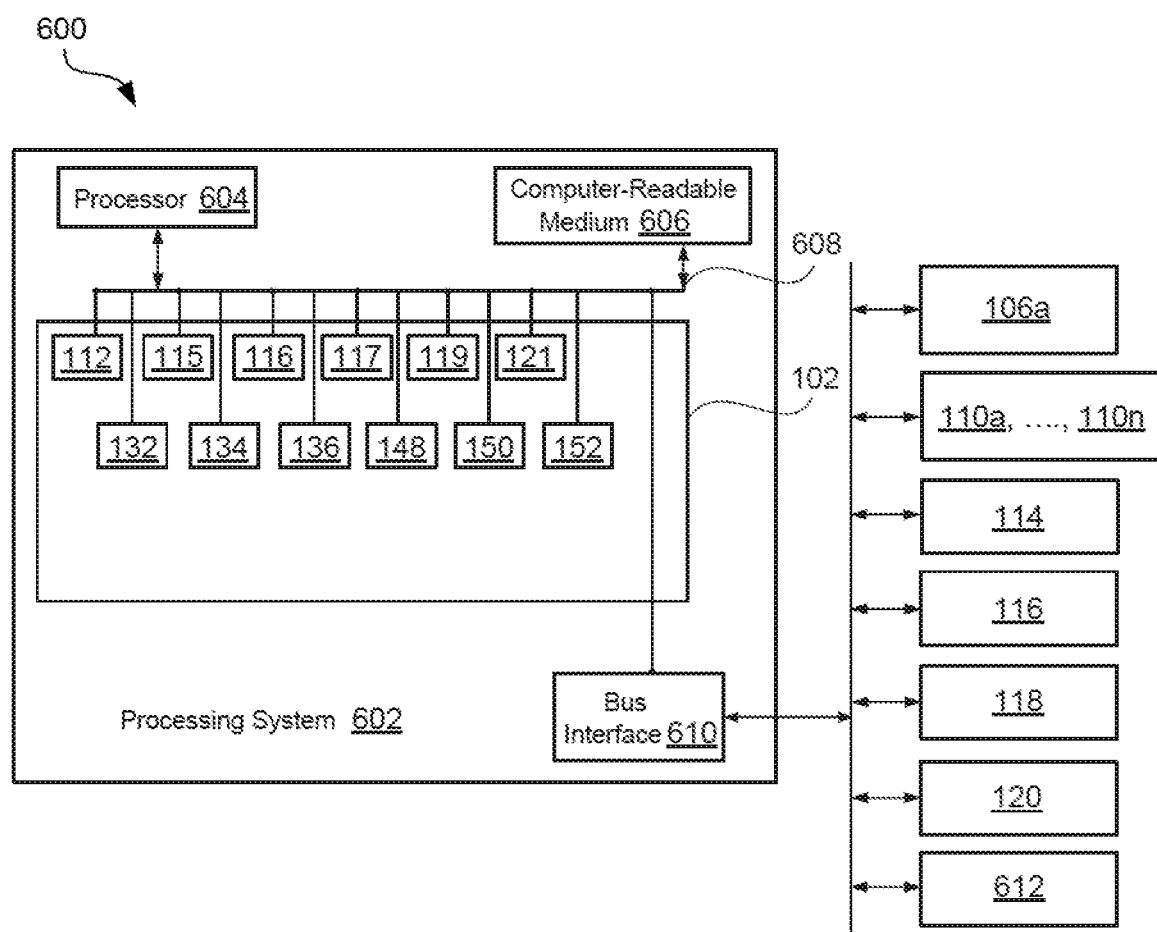
FIG. 6 is a conceptual diagram illustrating an example of a hardware implementation for the media packaging and distribution system employing a processing system for publishing a disparate live media output stream that complies with distribution format regulations, in accordance with an exemplary embodiment of the disclosure.

FIG. 6 is a conceptual diagram illustrating an example of a hardware implementation for the media packaging and distribution system employing a processing system for publishing a disparate live media output stream that complies with distribution format regulations, in accordance with an exemplary embodiment of the disclosure.

Referring to FIG. 6, the hardware implementation shown by a representation 600 for the stream playout and distribution system 112 employs a processing system 602 for publishing a disparate live media output stream that complies with distribution format regulations, in accordance with an exemplary embodiment of the disclosure, as described herein.

In some examples, the processing system 602 may comprise one or more hardware processor 604, a non-transitory computer-readable medium 606, a bus 608, a bus interface 610, and a transceiver 612. FIG. 6 further illustrates the VPC system 115, content processing system 121, the content processing system 121, the broadcast network scheduler 132, the traffic system 134, the schedule planning database 136, the indexing and storage system 148, the stream publishing engine 150, and the Live to On-Demand toolkit system 117, as described in detail in FIGS. 1A and 1B.

The hardware processor 604 may be configured to manage the bus 608 and general processing, including the execution of a set of instructions stored on the computer-readable medium 606. The set of instructions, when executed by the processor 604, causes the stream playout and distribution system 112 to execute the various functions described herein for any particular apparatus. The hardware processor 604 may be implemented, based on a number of processor technologies known in the art. Examples of the hardware processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the processor 604 when executing the set of instructions. The data is stored for short periods or in the presence of power. The computer-readable medium 606 may also be configured to store data for one or more of the VPC system 115, content processing system 121, the content processing system 121, the broadcast network scheduler 132, the traffic system 134, the schedule planning database 136, the indexing and storage system 148, the stream publishing engine 150, and the Live to On-Demand toolkit system 117.

The bus 608 is configured to link together various circuits. In this example, the media content packaging and distribution system 102 employing the processing system 602 and the non-transitory computer-readable medium 606 may be implemented with bus architecture, represented generally by bus 608. The bus 608 may include any number of interconnecting buses and bridges depending on the specific implementation of the media content packaging and distribution system 102 and the overall design constraints. The bus interface 610 may be configured to provide an interface between the bus 608 and other circuits, such as, the transceiver 612, and external devices, such as the source device 118, the external data source 120, the Ad decisioning server 106, and the consumer devices 110a, . . . , 110n.

The transceiver 612 may be configured to provide a communication of the stream playout and distribution system 112 with various other apparatus, such as the Ad decisioning servers 106a, . . . , 106n, the consumer devices 110a, . . . , 110n, the external data source 120, and the source device 118, via the network 108. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 6 may include software whose corresponding code may be executed by at least one processor, for across multiple processing environments. For example, the VPC system 115, content processing system 121, the content processing system 121, the broadcast network scheduler 132, the traffic system 134, the schedule planning database 136, the indexing and storage system 148, the stream publishing engine 150, and the Live to On-Demand toolkit system 117, may include software that may be executed across a single or multiple processing environments.

In an aspect of the disclosure, the processor 604, the computer-readable medium 606, or a combination of both may be configured or otherwise specially programmed to execute the operations or functionality of the VPC system 115, content processing system 121, the content processing system 121, the broadcast network scheduler 132, the traffic system 134, the schedule planning database 136, the indexing and storage system 148, the stream publishing engine 150, and the Live to On-Demand toolkit system 117, or various other components described herein, as described with respect to FIGS. 1A to 5.

Various embodiments of the disclosure comprise the media packaging and distribution system 102 that may be configured for publishing a disparate live media output stream that complies with distribution format regulations. The media packaging and distribution system 102 may comprise, for example, the stream playout and distribution system 112. The stream playout and distribution system 112 may further comprise the VPC system 115, content processing system 121, the content processing system 121, the broadcast network scheduler 132, the traffic system 134, the schedule planning database 136, the indexing and storage system 148, the stream publishing engine 150, and the Live to On-Demand toolkit system 117. In accordance with an embodiment, one or more processors in the stream publishing engine 150 may be configured to generate a preview based on a low-latency protocol for a plurality of live input streams. In accordance with an embodiment, the plurality of live input streams may include additional audio content that identifies location and duration of a non-programming content for live events that correspond to the plurality of live input streams. One or more media segments of a live input stream of the plurality of live input streams are edited based on manipulation of a manifest of the live input stream.

The VPC system 115 may be configured to generate an updated schedule based on one or more events identified in the preview of the live input streams in real-time. The updated schedule may include one or more transitions between the plurality of live input streams and a plurality of pre-encoded media assets. The stream publishing engine 150 may be configured to generate a disparate live media output stream manifest based on manipulation of manifests of the plurality of live input streams and the plurality of pre-encoded media assets in accordance with the updated schedule. The generated disparate live media output stream manifest may be delayed to allow decisions based on the preview of live input streams in a disparate live media output stream. The generated disparate live media output stream manifest may correspond to a disparate live media output stream. The disparate live media output stream may include programming content and non-programming content available to the one or more processors for immediate consumption. The disparate live media output stream complies with distribution format regulations.

In accordance with an embodiment, the programming content provided by the one or more processors in real time corresponds to one or more non-programming indicators and graphical treatment indicators. The programming content provided by the one or more processors in real time corresponds to closed captions and additional descriptors. The VPC system 115 may be configured to convert the programming content to a series of captioning files that are published in the content delivery system 160 and a captioning manifest that is indexed and published along with video and audio manifests corresponding to video and audio segments in the generated disparate live media output stream manifest.

In accordance with an embodiment, the stream publishing engine 150 may be configured to generate a preview of live input streams based on insertion of a new segment from a scheduled manifest of the live input stream into a preview manifest of the live input stream on an interval not greater than previous media segment duration. The preview of the live input stream is generated based on a low-latency protocol during original encode of the live input stream. For the preview of live input streams, the stream publishing engine 150 may be further configured to create a custom manifest to individually address a Group of pictures or a Sub-group of pictures within a media segment that allows a media player of a consumer device to operate closer to a live point of a live input stream. In accordance with an embodiment, for the preview of the live input streams, a custom player may be created to operate with a shorter buffer and operate closer to a live point of a live input stream.

The stream publishing engine 150 may be configured to determine insertion of a next media segment to the disparate live media output stream manifest based on the generated updated schedule. The generated updated schedule may indicate one or more of insertion of a non-programming content indicator and trafficked non-programming content for a specified duration of a non-programming content break, and insertion of the non-programming content indicator and filler content for the specified duration of the non-programming content break which allows a consumer device to replace the filler content with targeted non-programming content. The generated updated schedule may indicate a switch to an alternate live input stream due to one or more of: technical defects, a live event ended on a current live input stream ahead of scheduled time, or a provision of a different vantage point for the live event. The generated updated schedule may indicate insertion of filler program content as a first live event ended before scheduled time and the next event has not yet started. The generated updated schedule may further indicate a start of the next event ahead of schedule if the first live event ended early, a delay to switch to a next scheduled live input stream or a pre-encoded media asset if current live event runs for a time period that exceeds a threshold time period, insertion of a graphical treatment indicator to be inserted at the consumer device, and insertion of a programming content indicator to mark a beginning or an end of a live event in the disparate live media output stream manifest.

In accordance with an embodiment, the stream publishing engine 150 may be configured to provide the generated preview of the live input streams that comprises audio content to the machine and/or human captioning system 119. The machine and/or human captioning system 119 may be configured to generate programming content that includes live captions for one or more non-captioned live events. The stream publishing engine 150 may be configured to align a programming content manifest included in the disparate live media output stream manifest with video and audio media segments in the disparate live media output stream manifest.

In accordance with an embodiment, the VPC system 115 may be configured to mark a beginning and an end of a live event in an index of at least one of the plurality of live input streams based on the generated preview. The VPC system 115 may be further configured to include the marked live event in the at least one of the plurality of live input streams in the disparate live media output stream manifest on live or on delay according to the updated schedule for disparate live media output stream manifest. The VPC system 115 may be further configured to convert the marked live event in the at least one of the plurality of live input streams to a pre-encoded media asset of the plurality of pre-encoded media assets to support one of a replay or a delay of the marked live event to a time beyond when media segments remain available in a content delivery system and an index of the manifest of the live input stream remains in a memory unit.

In accordance with an aspect of the disclosure, a system, such as the Live to On-Demand toolkit system 117, may comprise one or more processors configured to capture a live input stream and a manifest of the live input stream from one of the content delivery system 160 or media storage 162. The Live to On-Demand toolkit system 117 may be further configured to identify one or more media segments referenced in the manifest for one or more edits. The one or more edits may correspond to removal or replacement of the one or more media segments referenced in the manifest based on one or more indicators in the manifest. The manifest of the live input stream may be manipulated based on the identified one or more media segments. Accordingly, a pre-encoded media asset may be generated for a repeated playback based on the manipulation of the manifest of the live input stream. In accordance with an embodiment, the schedule 111 may be defined that indicates whether an event in the live input stream is to be captured. The capture of the manifest may be based on a defined time specified in the schedule or based on a program start and or a program end indicators in the live input stream. The Live to On-Demand toolkit system 117 may be further configured to move the one or more media segments referenced in the manifest from an edge of the content delivery system 160. In accordance with various embodiments, the manipulation of the manifest may correspond to one or more of a removal of references to the one or more media segments prior to a live event start indicator and after a live event end indicator, and/or maintain indicators that mark locations of a non-programming content and removal of duration information and at least one referenced media segment that corresponds to originally schedule non-programming content. The duration of the non-programming content may be defined when generated pre-encoded media asset is played back or repeatedly played back. The manipulation of the manifest may further correspond insertion of one or more indicators that mark a location of a live event start and end and removal of references to the one or more media segments prior to the live event start and after the live event end in case the capture was based on a scheduled time that was inaccurate or an indicator which marks that the live event start or end was missed, and/or insertion of the one or more indicators that mark locations of non-programming content and a removal of the referenced one or more media segments for originally scheduled non-programming content in case an indicator for a non-programming content was missed. The manipulation of the manifest may further correspond a movement of an indicator that marks an event if was inaccurately aligned with media content and removal of the references to a desired media segment based on a new location of the event indicator, removal of the references to the one or more media segments that are to be excluded in the generated pre-encoded media asset, a delayed play of the live event, or a replay of the live event, a replacement of original audio media segments with alternative audio media segments, and/or insertion or a movement of the one or more indicators that mark graphical treatment if originally unmarked or improperly aligned with the media content in the live input stream. The alternative audio media segments may correspond to segments with muted audio if a portion of an audio content is to be excluded in the generated pre-encoded media asset, a delayed play of the live event, or a re-play of the live event.

In accordance with an embodiment, the Live to On-Demand toolkit system 117 may provide an interface to select, extract, and decrypt a defined range of the one or more media segments for additional one or more edits. The selected, extracted, and decrypted defined range of the one or more media segments corresponds to the highest quality profile and combined into a file format that correspond to one or more of a single video file, a single audio file for each audio track, and a single caption file for each supported language in case the one or more processors prefer the file format over a plurality of individual media segments in the defined range. The Live to On-Demand toolkit system 117 may be configured to download the file format for the define range and edited locally or remotely based on a video editing program. In accordance with an embodiment, the edited one or more media segments may be encoded and package to match a specifications of the live input stream. Further, the encoded and packaged one or more media segments may be published by the stream publishing engine 150 to the media storage 162 on the content delivery system 160.

In accordance with an embodiment, the Live to On-Demand toolkit system 117 may be configured to modify a manifest of the generated pre-encoded media asset for a live event to replace references to the original one or more media segments with the newly created edited one or more media segments. Accordingly, the stream publishing engine 150 may publish the manifest of the modified pre-encoded media asset for the live event to the media storage 162 on the content delivery system 160.

In accordance with an embodiment, the manifest of the modified pre-encoded media asset for a live event may be indexed by the indexing and storage system 148 as a new pre-encoded media asset and made available for a playback, a delayed playback in the live input stream, or a re-play of the live event in the disparate live media output stream.

Various embodiments of the disclosure may provide a computer-readable medium, such as the non-transitory computer-readable medium 606, having stored thereon, computer implemented instruction that when executed by the processor 604 causes the media packaging and distribution system 102 to execute operations for publishing a disparate live media output stream that complies with distribution format regulations. In accordance with an embodiment, the processor 604 causes the stream playout and distribution system 112 in the media packaging and distribution system 102 to execute operations to generate a preview based on a low-latency protocol for a plurality of live input streams. In accordance with an embodiment, the plurality of live input streams may include additional audio content that identifies location and duration of a non-programming content for live events that correspond to the plurality of live input streams. One or more media segments of a live input stream of the plurality of live input streams are edited based on manipulation of a manifest of the live input stream.

The processor 604 causes the VPC system 115 to execute operations to generate an updated schedule based on one or more events identified in the preview of live input streams in real-time. The updated schedule may include one or more transitions between the plurality of live input streams and a plurality of pre-encoded media assets. The stream publishing engine 150 may be configured to generate a disparate live media output stream manifest based on manipulation of manifests of the plurality of live input streams and the plurality of pre-encoded media assets in accordance with the updated schedule. The generated disparate live media output stream manifest may be delayed to allow decisions based on the previewed live input streams in a disparate live media output stream. The generated disparate live media output stream manifest may correspond to a disparate live media output stream. The disparate live media output stream may include programming content and non-programming content available to the one or more processors for immediate consumption. The disparate live media output stream complies with distribution format regulations.

Typically, in the broadcast industry, production control systems are utilized to allow an operator to switch between live input streams received from live sources, play pre-encoded media assets, such as VOD assets, insert and trigger non-programming content, and insert graphical treatment, such as network and program rating bugs. Further, for sources without embedded closed captions, the production control systems also support providing an audio feed to an operator, such as a stenographer, for creation and insertion of the closed captions. The output of such production control systems are referred to as a fully produced feed ready for distribution.

However, such production control systems require the live sources to be aggregated at a central location, so that the production control systems can decode corresponding live input streams into baseband for processing. The aggregation and decoding is essential in case of live input streams as corresponding schedules tend to change owing to various reasons, such as when live events or programs end early or run long. Such systems require all the content to be back-hauled, encoded, decoded, and then re-encoded at different times. In case of the pre-encoded media assets, fast switching may be required between the redundant broadcast air chains in case of a failure. But, this approach is expensive and is therefore suited for such channels that can attract large audiences to justify the cost.

Leveraging an understanding of modern web streaming protocols, the media packaging and distribution system 102 may virtualize the production control functions, eliminating the need to aggregate and decode the live sources at a central location, and continue reduction in latency for such protocols. Thus, not everything has to come back to a central control location, get decoded and processed. An operator is provided with a view of the available live sources slightly ahead of the end consumer. The operator may then in real-time adjust the schedule to control switching between the various live input sources and On-Demand content including ads, as well as insert ad and overlay indicators into the live output manifest. The switches may be executed simply by manipulating the text-based live output manifest based on instructions from the operator. Content is allowed to be published to a content delivery system and leverage manifest manipulation, perform switching, using an extra manifest with closed captions and insert the manifest to video content. Thus, a new manifest may be created with closed captions based on other streams, like live-to-live streams and VOD-to-live signals, at the client side.

Because the media content itself does not need to be processed beyond the initial creation of the live streams and pre-encoded media assets prepared for web distribution, it is extremely inexpensive to provide a fully produced output feed. It is based solely on the cost to manipulate the text-based manifests, which provide the instructions for the receivers or consumer devices to execute. The system can support targeted ad insertion at the receiver or individual consumer devices through the insertion of tags in the live stream manifest. It further leverages the processing power of the receivers and consumer devices to insert targeted channel graphics and overlay advertisements and promotions.

The switch time between the live sources is equal to the duration of the adaptive bit rate segment, which over the past few years has decreased from 10 seconds to 2 seconds and will continue to reduce over time, for example half-a-second. The media packaging and distribution system 102 facilitates the switch latency to continue to decline with the segment duration due to enhanced performance of the content delivery system. In certain examples, for example, sports gambling, latencies are further required to be dropped.

The VPC system 115 may archive live programs, for example Olympics being broadcasted from a foreign location as live stream in another time zone, for an event replay at a desired time, for example 2-3 hours later. In addition to archiving the program as a pre-encoded media asset, the media packaging and distribution system 102 may mark the location of the ad breaks while removing the underlying content for the duration of the break, so said breaks can be eliminated, reduced in duration, or extended in duration when the asset is replayed.

Finally included in the Live to On-Demand toolkit is the functionality to edit portions of the archived content prior to replay. Editing may be done to simply remove some of the referenced video and audio segments from the manifest if something happened in the live show that should not be included in the replay, to replace some of the audio segments with muted audio if something was said during the live broadcast that needs to be removed, or to download and edit a short sequence of video and audio segments, submit only that portion of the asset to the content processing system, and then edit the manifest to reference the edited segments. For example, in case of a Live baseball game, if a player flips off, a fan wouldn't like to watch the same. Thus, the Live to On-Demand toolkit may facilitate such segments to be removed from the broadcast content.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing a disparate live media output stream using pre-encoded media assets.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   memory for storing instructions; and
   a processor for executing the instructions to perform a method, the method comprising:
      generating a preview of live input streams based on a low-latency protocol for a plurality of live input streams;
      generating an updated schedule based on an event identified in the preview of the live input streams in real-time; and
      generating a disparate live media output stream manifest based on manipulation of manifests of the plurality of live input streams and a plurality of pre-encoded media assets in accordance with the updated schedule.

2. The system according to claim 1, wherein the updated schedule includes a transition between the plurality of live input streams and the plurality of pre-encoded media assets,
   wherein the generated disparate live media output stream manifest is delayed to allow decisions based on the preview of the live input streams in a disparate live media output stream,
   wherein the generated disparate live media output stream manifest corresponds to the disparate live media output stream, and
   wherein the disparate live media output stream complies with distribution format regulations.

3. The system according to claim 1, wherein the plurality of live input streams include additional audio content that identifies location and duration of a non-programming content for live events that correspond to the plurality of live input streams, and
   wherein a media segment of a live input stream of the plurality of live input streams is edited based on manipulation of a manifest of the live input stream.

4. The system according to claim 2, wherein the method further comprising:
   converting programming content to a series of captioning files that are published in a content delivery system and a captioning manifest that is indexed and published along with video and audio manifests corresponding to video and audio segments in the generated disparate live media output stream manifest, wherein the disparate live media output stream includes the programming content and non-programming content available to the processor for immediate consumption, wherein the programming content provided by the processor in real-time corresponds to one or more of a non-programming indicator, a graphical treatment indicator, a closed caption, and an additional descriptor.

5. The system according to claim 1, wherein the method further comprising:
generating a preview of a live input stream based on insertion of a new segment from a scheduled manifest of the live input stream into a preview manifest of the live input stream on an interval not greater than a previous media segment duration,
wherein the preview of the live input stream is generated based on the low-latency protocol during original encode of the live input stream; and
determining insertion of a next media segment to the disparate live media output stream manifest based on the generated updated schedule.

6. The system according to claim 1, wherein, for the preview of the live input streams, the method further comprising:
creating a custom manifest to individually address a Group of pictures or a Sub-group of the pictures within a media segment that allows a media player of a consumer device to operate closer to a live point of a live input stream.

7. The system according to claim 1, wherein, for the preview of the live input streams, the method further comprising:
creating a custom player to operate with a shorter buffer and operate closer to a live point of a live input stream.

8. The system according to claim 1, wherein the generated updated schedule indicates:
insertion of a non-programming content indicator and trafficked non-programming content for a specified duration of a non-programming content break,
insertion of the non-programming content indicator and filler content for the specified duration of the non-programming content break which allows a consumer device to replace the filler content with targeted non-programming content,
a switch to an alternate live input stream due to technical defects, a live event ended on a current live input stream ahead of scheduled time, and/or a provision of a different vantage point for the live event,
insertion of a filler program content as a first live event ended before the scheduled time and a next event has not yet started,
a start of the next event ahead of schedule if the first live event ended early,
a delay to switch to a next scheduled live input stream or a pre-encoded media asset if current live event runs for a time period that exceeds a threshold time period,
insertion of a graphical treatment indicator to be inserted at the consumer device, and/or
insertion of a programming content indicator to mark a beginning or an end of the live event in the disparate live media output stream manifest.

9. The system according to claim 1, wherein the method further comprising:
providing the generated preview of the live input streams that comprises audio content to a machine and/or human captioning system,
wherein the machine and/or human captioning system generates programming content that includes live captions for a non-captioned live event; and
aligning a programming content manifest included in the disparate live media output stream manifest with video and audio media segments in the disparate live media output stream manifest.

10. The system according to claim 1, wherein the method further comprising:
marking a beginning and an end of a live event in an index of one of the plurality of live input streams based on the generated preview;
including the marked live event in the one of the plurality of live input streams in the disparate live media output stream manifest on live or on delay according to the updated schedule for the disparate live media output stream manifest; and
converting the marked live event in the one of the plurality of live input streams to a pre-encoded media asset of the plurality of pre-encoded media assets to support one of a replay or a delay of the marked live event to a time beyond when media segments remain available in a content delivery system and an index of a manifest of the one of the plurality of live input streams remains in a memory unit.

11. A method, comprising:
generating, at a processor, a preview of live input streams based on a low-latency protocol for a plurality of live input streams;
generating, by the processor, an updated schedule based on an event identified in the preview of the live input streams in real-time; and
generating, by the processor, a disparate live media output stream manifest based on manipulation of manifests of the plurality of live input streams and a plurality of pre-encoded media assets in accordance with the updated schedule.

12. The method according to claim 11, wherein the updated schedule includes a transition between the plurality of live input streams and the plurality of pre-encoded media assets,
wherein the generated disparate live media output stream manifest is delayed to allow decisions based on the preview of the live input streams in a disparate live media output stream,
wherein the generated disparate live media output stream manifest corresponds to the disparate live media output stream,
wherein the disparate live media output stream includes programming content and non-programming content available to the processor for immediate consumption, and
wherein the disparate live media output stream complies with distribution format regulations.

13. The method according to claim 12, further comprising:
providing, by the processor, the programming content in real-time that corresponds to one or more of a non-programming indicator, a graphical treatment indicator, a closed caption and an additional descriptor; and
converting, by the processor, the programming content to a series of captioning files that are published in a content delivery system and a captioning manifest that is indexed and published along with video and audio manifests corresponding to video and audio segments in the generated disparate live media output stream manifest.

14. The method according to claim 11, further comprising:
- editing, by the processor, a media segment of a live input stream of the plurality of live input streams based on manipulation of a manifest of the live input stream, wherein the plurality of live input streams includes additional audio content that identifies location and duration of a non-programming content for live events that correspond to the plurality of live input streams;
- generating, by the processor, a preview for the live input stream based on insertion of a new segment from a scheduled manifest of the live input stream into a manifest of the preview of the live input stream on an interval not greater than a previous media segment duration,
  - wherein the preview of the live input stream is generated based on the low-latency protocol during original encode of the live input stream; and
- determining, by the processor, insertion of a next media segment to the disparate live media output stream manifest based on the generated updated schedule.

15. The method according to claim 11, further comprising creating, by the processor for the preview of the live input streams, a custom manifest to individually address a Group of pictures or a Sub-group of the pictures within a media segment that allows a media player of a consumer device to operate closer to a live point of a live input stream.

16. The method according to claim 11, further comprising creating, by the processor for the preview of the live input streams, a custom player to operate with a shorter buffer and operate closer to a live point of a live input stream.

17. The method according to claim 11, wherein the generated updated schedule indicates:
- insertion of a non-programming content indicator and trafficked non-programming content for a specified duration of a non-programming content break,
- insertion of the non-programming content indicator and filler content for the specified duration of the non-programming content break which allows a consumer device to replace the filler content with targeted non-programming content,
- a switch to an alternate live input stream due to technical defects, a live event ended on a current live input stream ahead of scheduled time, and/or a provision of a different vantage point for the live event,
- insertion of a filler program content as a first live event ended before the scheduled time and a next event has not yet started,
- a start of the next event ahead of schedule if the first live event ended early,
- a delay to switch to a next scheduled live input stream or a pre-encoded media asset if current live event runs for a time period that exceeds a threshold time period,
- insertion of a graphical treatment indicator to be inserted at the consumer device, and/or
- insertion of a programming content indicator to mark a beginning or an end of the live event in the disparate live media output stream manifest.

18. The method according to claim 11, further comprising:
- providing, by the processor, the generated preview of the live input streams that comprises audio content to a machine and/or human captioning system,
  - wherein the machine and/or human captioning system generates programming content that includes live captions for a non-captioned live event; and
- aligning, by the processor, a programming content manifest included in the disparate live media output stream manifest with video and audio media segments in the disparate live media output stream manifest.

19. The method according to claim 11, further comprising:
- marking, by the processor, a beginning and an end of a live event in an index of one of the plurality of live input streams based on the generated preview;
- including, by the processor, the marked live event in the one of the plurality of live input streams in the disparate live media output stream manifest on live or on delay according to the updated schedule for the disparate live media output stream manifest; and
- converting, by the processor, the marked live event in the one of the plurality of live input streams to a pre-encoded media asset of the plurality of pre-encoded media assets to support one of a replay or a delay of the marked live event to a time beyond when media segments remain available in a content delivery system and an index of a manifest of the one of the plurality of live input streams remains in a memory unit.

20. A non-transitory computer readable medium, having stored thereon, computer executable code, that when executed by a processor, causes the processor to execute operations, the operations comprising:
- generating a preview of live input streams based on a low-latency protocol for a plurality of live input streams;
- generating an updated schedule based on an event identified in the preview of the live input streams in real-time; and
- generating a disparate live media output stream manifest based on manipulation of manifests of the plurality of live input streams and a plurality of pre-encoded media assets in accordance with the updated schedule.

* * * * *